US007677896B1

(12) United States Patent
Sonwalkar

(10) Patent No.: US 7,677,896 B1
(45) Date of Patent: Mar. 16, 2010

(54) SYSTEM, METHOD, AND COMPUTER-READABLE MEDIUM FOR COURSE STRUCTURE DESIGN TO SUPPORT ADAPTIVE LEARNING

(76) Inventor: Nishikant Sonwalkar, 100 Memorial Dr., Cambridge, MA (US) 02142

( * ) Notice: Subject to any disclaimer, the term of this patent is extended or adjusted under 35 U.S.C. 154(b) by 148 days.

(21) Appl. No.: 10/368,848

(22) Filed: Feb. 19, 2003

Related U.S. Application Data

(60) Provisional application No. 60/357,934, filed on Feb. 19, 2002.

(51) Int. Cl.
*G09B 19/00* (2006.01)
(52) U.S. Cl. ...................................................... 434/236
(58) Field of Classification Search ................ 434/322, 434/323, 350, 362, 236–8
See application file for complete search history.

(56) References Cited

U.S. PATENT DOCUMENTS

| | | | | |
|---|---|---|---|---|
| 6,149,441 | A * | 11/2000 | Pellegrino et al. | 434/350 |
| 6,164,975 | A * | 12/2000 | Weingarden et al. | 434/322 |
| 6,301,462 | B1 * | 10/2001 | Freeman et al. | 434/350 |
| 2002/0087346 | A1 * | 7/2002 | Harkey | 434/433 |
| 2002/0087416 | A1 * | 7/2002 | Knutson | 705/23 |
| 2002/0115051 | A1 * | 8/2002 | Sanda | 434/350 |
| 2002/0142278 | A1 * | 10/2002 | Whitehurst et al. | 434/350 |
| 2002/0143873 | A1 * | 10/2002 | Lamp | 434/323 |
| 2003/0039949 | A1 * | 2/2003 | Cappellucci et al. | 434/362 |

OTHER PUBLICATIONS

Sonwalkar, Nishikant; "Changing the Interface of Education with Revolutionary Learning Technologies"; Campus Technology; Nov. 6, 2001; retrieved from Internet May 5, 2009 Internet URL <http://campustechnology.com/Articles2001/11/Changing-the-Interface-of-Education-with-Revolutionary-Learning-Teachnologies>.*
Sonwalkar, Nishikant; "A New Methodology for Evaluation: The Pedagogical Rating of Online Courses"; Campus Technology; Dec. 21, 2001; retrieved from Internet May 5, 2009 Internet URL <http://campustechnology.com/Articles/2001/12/A-New-Methodology-for-Evaluation-The-Pedagogical-Rating-of-Online-Courses>.*

* cited by examiner

Primary Examiner—Kathleen Mosser

(57) ABSTRACT

Automated system enabling educators to create and organize educational materials appealing to students' varied learning styles and cognitive capabilities. Templates conforming to five basic learning styles are provided for material creation and organization, though other templates conforming to other learning styles are definable as well. Once created, educational materials are exported to complementary systems for presentation to students via a standard electronic interface.

7 Claims, 21 Drawing Sheets

| File name | Concept | trigger | qualifier | qualifier | qualifier | qualifier |
|---|---|---|---|---|---|---|
| F1.html | Light Signaling | step | | | | |
| F2.gif | LS | | description | | | |
| F3.html | LS | | | example | | |
| F4.html | LS | | | | exposition | |
| F5.rm | LS | | | | | procedure |
| F6.doc | Wireless Communication | step | | | | |
| F7.jpeg | WC | | | example | | |
| F8.doc | WC | | example | | | |
| F9.rm | WC | | | | exposition | |
| F10.anim | WC | | | | description | procedure |
| F11.text | Start Chart | step | | | | |
| F12.gif | SC | | description | | | |
| F13.html | SC | | | | | procedure |

FIG. 19

SYSTEM, METHOD, AND COMPUTER-READABLE MEDIUM FOR COURSE STRUCTURE DESIGN TO SUPPORT ADAPTIVE LEARNING

This application claims priority under 35 USC §119(e) to provisional application Ser. No. 60/357,934, filed Feb. 19, 2002, having the same title.

FIELD OF THE INVENTION

This invention relates to computer software, and more particularly to software used (e.g., by educators) to create educational materials designed to appeal to individual students' learning styles and cognitive abilities.

BACKGROUND

The mechanics of human learning have been the subject of extensive research for many years. Various scientific disciplines have endeavored to understand the machinations of the human brain, to grasp exactly how it processes and retains concepts such as language, mathematics, logic and the like. Experts in these various disciplines, including neurosurgeons, cognitive scientists, psychologists, linguistic specialists, and artificial intelligence researchers, have each posed theories, usually specific to their particular field, as to exactly how the human brain processes stimuli to retain knowledge. Disagreement may suggest that a single hypothesis is insufficient, perhaps because we all learn differently—even at the fundamental level of inciting neurons to fire.

Research has shown that in the cognitive process, each sensory faculty (touch, smell, sound, vision and taste), or mode of cognition, is typically used for learning—and that modes are usually used in combination. Research has also demonstrated that, with regard to education, the modes used most often are sound (i.e., listening comprehension), sight (i.e., ocular comprehension), and touch (i.e., haptic comprehension). However, the combination used by a student in a particular learning situation often depends on their particular preferences for structure, sequence, and media presented—which are not static and may be dependent on the subject matter. The most effective way to presenting material to make a particular Student X learn French, for example, will often differ from the most effective way to present material to make Student X learn calculus. Further, the most effective way to present French to Student X usually differs from the most effective way to present it to Student Y.

Conventional teaching methods offer little in the way of flexible adaptation to accommodate multiple learning styles, and as such often fail to engage students. The lack of flexibility is perhaps best illustrated by the prevalence of the lecture, or classroom presentation, format. This format, admittedly the most cost-effective method for an educator to impart knowledge, is a largely passive exercise for the student even when supplemented with question-and-answer activity, and one which typically uses only ocular and listening comprehension, utilizing only a fraction of the typical student's cognitive abilities. As such, the material presented may not engage students as it should, and some may become inattentive. Many educators, recognizing that students are not sufficiently engaged, will adopt a more animated or theatrical style to maintain students' attention throughout a 60-to-90 minute discourse. Theatrics, however, do not necessarily equate to a presentation that conforms to educational standards. Further, because lectures are often delivered in a group setting, social pressures on students (e.g., fear of standing out) can take hold, curbing participation and making the exercise even more passive, and preventing material from being absorbed as it should be. The lack of flexibility in accommodating varied learning styles—styles through which cognitive capabilities are utilized differently—is one of the primary deficiencies of conventional teaching methods.

SUMMARY OF THE INVENTION

The present invention overcomes these and other limitations by providing system, method, and computer-readable medium for course design to support adaptive and personalized interactive learning experiences based on students' particular learning styles.

In one aspect of the invention, a method is provided for the development of a course structure hierarchy comprising at least one concept that includes at least one taxonomy, wherein the taxonomy corresponds to a learning style selected from a known group of learning styles which may be exhibited by a student, and comprises a defined sequence including a trigger element and at least one qualifier element adapted to the considered learning style. The method comprises providing a course structure hierarchy objective, defining at least one concept to comprise the course structure hierarchy, defining at least one taxonomy to comprise the concept, and providing content adapted to the taxonomy to comprise the trigger element and the at least one qualifier element. Predefined taxonomies may be provided which conform to known student learning styles including apprenticeship, incidental, deductive, inductive, and discovery styles. Additional taxonomies may be developed with further knowledge of learning styles.

This method may be practiced using a suitably programmed computer, implementing an architecture comprising a graphical user interface and a series of back-end modules (i.e., programmed instructions) codifying the method. The method may be employed using content that may be comprised of any of a number of multimedia formats, including graphics, text, audio, video, and other types. The method may further include publishing the course structure hierarchy to another component or system which will display the content to one or more students. The method may also include creation of a manifest file (which may be in XML or other format to provide exportability and allow platform independence), which describes the course structure hierarchy and enables it to be utilized with a number of systems or components. The method may also include creation of a metadata file, also describing the course structure hierarchy, and also enabling the course structure hierarchy to be utilized by other systems or components.

In a second aspect of the invention, an automated method is provided for creating a body of instructive content, comprising using (from a content provider) an inventory of instructive content assets in a repository adapted to receive and execute queries, using (from a lesson plan creator) a list of desired instructive content assets defined by at least one learning style, generating at least one query to extract the instructive content assets found on the list of desired instructive content assets from the inventory of instructive content assets, transmitting the at least one query to the repository, executing the at least one query, and processing the instructive content assets received in response to executing the query, to assemble at least one body of instructive content.

This method may be practiced on electronic instructive content comprised of multimedia (i.e., graphics, text, audio, video, and other types). This method may also include producing metadata for associating particular assets with particular course steps. This method may further include loading assets to database, which may be a SQL database.

In a third aspect of the invention, a method is provided for defining a learning style to capitalize on the cognitive competence of a student, comprising providing a trigger element adapted to attract the interest of the student, providing at least one subsequent qualifier element adapted to the student's cognitive competence to effectively impart information.

This method may be implemented using a computer-based system which includes a graphical user interface and a series of back-end modules defining creating course materials. The method may include one or more qualifier elements comprised of multimedia (i.e., graphics, text, audio, video, and other types). Further, the learning model may be designed to appeal to learning styles including the apprenticeship, discovery, inductive, deductive, and incidental learning styles.

In a fourth aspect of the invention, a computer-readable medium is provided with instructions recorded thereon, which instructions, when executed, cause at least one processor in a computer to enable a user to create a course structure hierarchy comprising at least one concept, wherein the concept includes at least one taxonomy, and wherein the taxonomy is adapted to a learning style exhibited by a student and comprises a definable sequence including a trigger element and at least one qualifier element adapted to the considered learning style, and enable a user to associate content to the taxonomy to comprise the trigger element and the at least one qualifier element.

The computer-readable medium may further comprise instructions enabling the user to publish the created course structure hierarchy and associated content to a server-based repository, and publication may further include creation of a manifest file (which may be in XML or other format) describing the course structure hierarchy and associated content, and/or creation of a metadata file describing the course structure hierarchy and associated content.

In a fifth aspect of the invention, a computer-readable medium is provided with instructions recorded thereon, which, when executed, cause at least one processor in a networked computer system to enable a user to make available an inventory of instructive content assets (the inventory representative of instructive content assets stored in a repository adapted to receive and execute queries), enable a lesson plan creator to provide a list of desired instructive content assets, generate at least one query to extract the instructive content assets found on the list of desired instructive content assets and on the inventory of the instructive content assets, transmit the at least one query to the repository, execute the at least one query, and process the instructive content assets received in response to the execution of the query, to assemble a body of instructive content.

The instructions may further comprise producing a metadata file which associates particular assets with particular course steps. Further, the instructions may comprise processing the content assets to load them to a database, which may be a SQL database.

In a sixth aspect of the invention, a computer-readable medium is provided with metadata recorded thereon which, when utilized by programmed instructions executed by at least one processor in a computer, enable the processor to associate at least one data element found in a body of instructive content with one of programmed instructions adapted to process the at least one data element.

In a seventh aspect of the invention, a computer-readable medium is provided with instructions recorded thereon which, when executed by at least one processor in a computer, enable the processor to create variations on existing bodies of educational content in an automated fashion. This computer-readable medium may be utilized to facilitate the creation of bodies of educational content in multiple languages.

In an eighth aspect of the invention, a method is provided for the automated creation of a variation on an existing a body of instructive content, comprising providing a body of educational content, and executing at least one programmed instruction to create the variation. This method may be practiced to create bodies of educational content in multiple languages. This method may also be practiced using a computer-based system which includes a graphical user interface and a series of back-end modules defining creating the variation. This method may further be practiced on electronic instructive content comprised of multimedia (i.e., graphics, text, audio, video, and other types).

DESCRIPTION OF DRAWINGS

In the drawings:

FIG. 19 depicts an illustrative embodiment of metadata created by the system;

DETAILED DESCRIPTION

Figure 1:
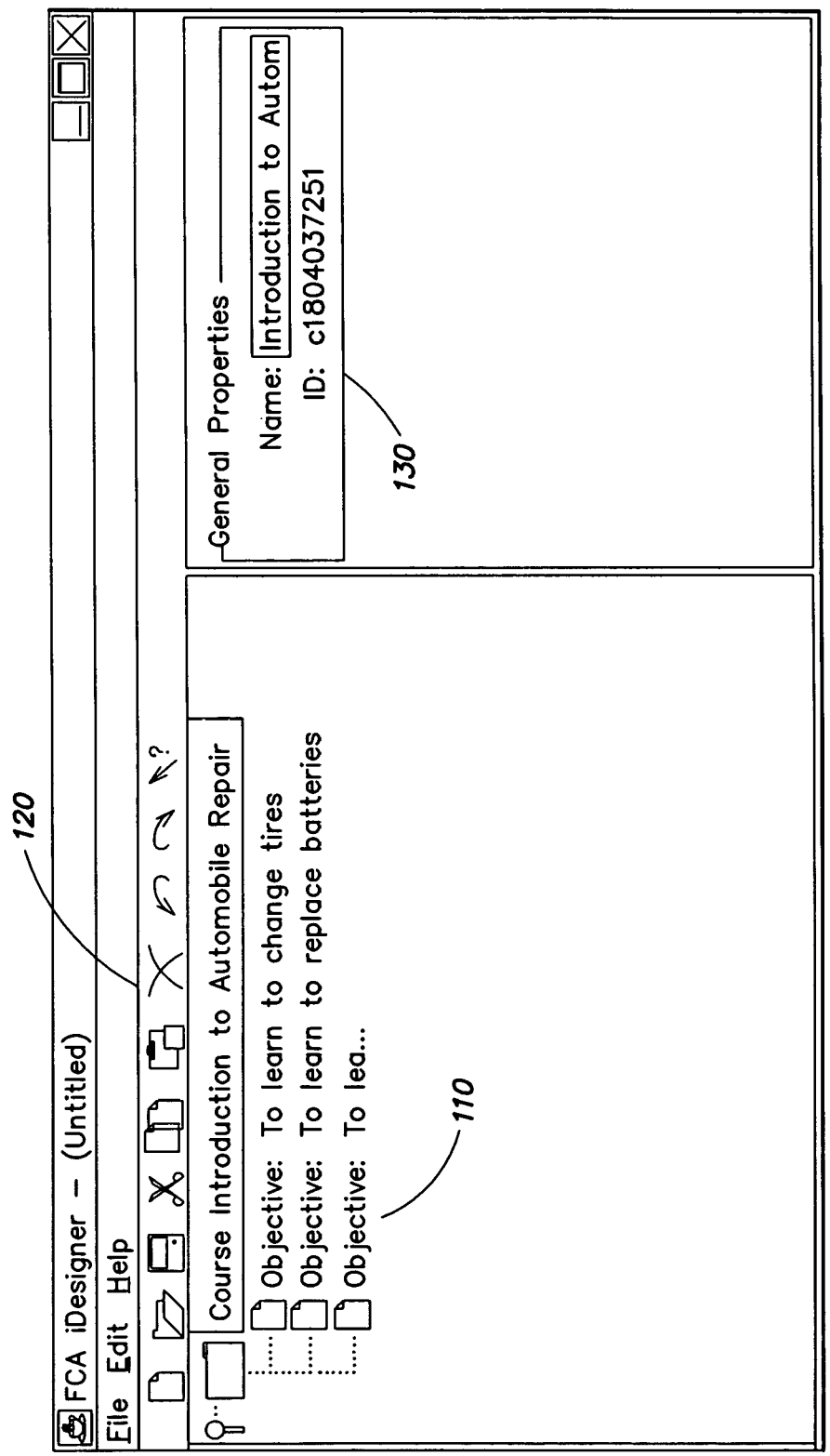
FIG. 1 depicts a screen display for an illustrative system embodiment showing user's input of course name and objectives.

The present invention comprises a system and method for enabling users (typically, or even preferably, educators) to create and organize educational materials that appeal to varied learning styles, and cognitive capabilities, exhibited by students. Without limitation, five standard learning styles are provided for, and templates that conform to these five learning styles serve as "style sheets" to guide educational material creation and organization (however, other learning styles may be accommodated and corresponding templates may readily be created). Once created, materials may be exported to complementary systems or components, and may then be presented to students on a number of standard electronic interfaces. One such complementary component might be a server-based software application that receives exported material and coordinates its presentation using diagnostic tools to discern how the student learns the considered subject most effectively (i.e., identifies the student's learning style and cognitive abilities), and adapts material presentation accordingly, to optimize the student's learning experience.

GLOSSARY

Throughout this application, several key terms are used to convey the present invention's form and function. Within the application, these terms, whether in initial upper case letters or all lower case, are defined (unless context indicates otherwise) as follows:

Learning Style: A student's intrinsically preferred manner of educational content presentation and processing for effective learning. The inventor has incorporated five primary learning styles into the present invention: Apprenticeship, Deductive, Inductive, Incidental, and Discovery. However, neither the disclosed embodiments nor the invention are limited to this group of learning styles.

Cognitive Pathway The one or more senses used by a student to absorb a body of educational material.

Course Structure Hierarchy: An organized collection of educational materials that collectively impart a particular subject to a student.

Concept: Within the course structure hierarchy, a topic to be imparted to the student as part of the considered subject.

Concept Layer: A collection of concepts, usually grouped to collectively achieve an educational objective and arranged in a manner intended to increase the complexity or depth of the material as the student progresses through the collection.

Content Group: Within a concept, a series of content assets whose sequence and format is prescribed by a particular taxonomy.

Content Asset: Within a content group, a particular piece of multimedia (e.g., text, graphic, audio, video, or other) presented to the student. Within the system, this is the most atomic element in the course structure hierarchy.

Metadata: An electronic descriptor file, usually comprised of a series of rows and columns, describing the attributes and interrelationships of elements of a course structure hierarchy. The file is usually provided in text, or in table form that conforms to a particular database management system.

Metatag: A metadata file entry, usually corresponding to a particular element (e.g., a content asset) in the course structure hierarchy.

Taxonomy: A template using keywords conforming to a particular learning style for presenting a body of educational material to a student.

Content Aggregation: The process of sequencing educational content in a manner that will conform to a learning style.

Other terms are defined when they appear.

Intelligent and Adaptive Computer-Based Learning

A system or method practicing the present invention employs extensive knowledge about the effective presentation of educational material based on students' individual learning styles and cognitive abilities. Five prevalent learning styles—the Apprenticeship, Incidental, Inductive, Deductive, and Discovery styles—are addressed in the disclosed illustrative embodiments, as are particularly effective cognitive pathways for students who exhibit these learning styles, encompassing (within the context of computer-based learning) text, graphics, audio, video, animation and simulations (and in some cases, haptic interfaces).

The present invention allows the educator to assemble and organize educational (course or unit) content in such a way as to account for combinations of learning styles and cognitive pathways, and to prepare feedback and provide for revision of concepts given student interaction with the material. Taxonomies (templates) provide a "knowledge base" about learning styles and guide material assembly and organization, to effectively provide varied versions of the same material. The taxonomies are structured to prompt the course designer to provide an initial, engaging "Trigger" element, followed by a prescribed series of "Qualifier" elements, each designed to take advantage of the student's learning style and most effective cognitive pathways. Once varied versions of the same material are established, each appealing to different learning styles and cognitive abilities, the object of the architecture (of which the present invention is a component) is to adapt material presentation over time, as the architecture discerns the student's capabilities and preferences, to present material that conforms (as closely as is reasonable) to those capabilities and preferences. The architecture's adaptive capability creates a powerful, student-centric learning tool.

Trigger elements within taxonomies are content assets designed to engage the student that exhibits a particular learning style and are tailored to cognitive abilities most often displayed by students with that learning style. For instance, students that exhibit the Incidental learning style (as discussed in more detail below) are often most effectively engaged when presented with concepts under the guise of a story. The Trigger element for Incidental learners, then, is typically a text-based and/or graphical content asset that tells at least a portion of that story. Qualifier elements follow the Trigger and are designed to retain the student's attention by presenting material in a form and sequence that most conforms to their preferences (which is typically also their learning style). There may be any number of Qualifier elements within a taxonomy (including zero), driven by the amount of material to be taught, the extent to which the educator wishes to achieve content granularity, and the frequency with which the educator wishes to quiz students after delivering content.

Learning styles are defined by students' intrinsically preferred ways of material presentation and methods of processing information into usable knowledge. Students exhibiting the Apprenticeship learning style are usually most engaged by a "building block," step-by-step, procedural method of presenting content, and so the taxonomy prescribes a text-based Step Trigger (which provides explanations, descriptions, and/or examples), followed by prescribed Qualifier elements including graphics or animated illustrations (to provide subsequent explanations, descriptions, illustrations, demonstrations, examples, and/or a procedure), audio (to provide explanations and/or examples), and/or video (to provide explanations and/or examples).

Students exhibiting the Incidental learning style, as discussed above, are usually most engaged by "events" that trigger the learning experience, usually in a story format. Students are presented with an occurrence (e.g., an event in the story) that introduces the target concept and provokes questions, and then to topics related to the target concept, so the taxonomy prescribes a text-based Trigger (to provide explanations and/or a story line), followed by prescribed Qualifier elements including graphics or animated illustrations (to provide explanations, descriptions, illustrations, demonstrations and/or examples), audio (to provide procedures and/or examples), and/or video (to provide steps, procedures and/or examples).

Students exhibiting the Inductive learning style are usually most engaged by first being introduced to a principle, then to specific topics and examples that pertain to the principle, enabling them to develop their own connections between topics/examples and principle. Thus the taxonomy prescribes a text Trigger element (to provide explanations and/or prompt questions), followed by prescribed Qualifier elements including graphics or animated illustrations (to provide explanations, descriptions, illustrations, demonstrations and/or examples), audio (for explanations and/or examples), and/or video (for explanations and/or examples).

Students exhibiting the Deductive learning style are usually most engaged when challenged to discern trends and infer concepts from data, simulations, graphs, and/or charts. Therefore the taxonomy prescribes a simulation Trigger (including interactive simulations and/or virtual labs), followed by Qualifiers including text (for explanations and/or to prompt questions), graphics/animated illustrations (to provide explanations, descriptions, illustrations, demonstrations and/or examples), audio (for explanations and/or to provide examples), and/or video (to provide explanations and/or examples).

Students exhibiting the Discovery learning style are usually most engaged when asked to "learn by doing." Typically students are introduced to the target concept with an initial interactive exercise, simulation or quiz, so the prescribed Trigger element is a simulation (to provide interactivity and/or facilitate virtual experimentation), followed by prescribed Qualifier elements including text (to provide explanations and/or prompt questions), graphics/animated illustrations (to provide explanations, descriptions, illustrations, demonstrations, and/or examples), audio (for explanations and/or examples), or video (for explanations and/or examples).

Diagnosis of the student's learning style, and if appropriate, alternatives to the taxonomy-prescribed cognitive pathways, is accomplished by an overall architecture that includes the present invention. The coded logic that performs the diagnosis preferably executes on complementary architecture components, such as the server-based component discussed in the foregoing. In some system embodiments, however, presentation and adaptation logic might be built into a variation of the present invention. The overall architecture and learning style diagnosis thus are useful with, but are not necessarily part of, the various aspects of the invention presented herein. Further, the present invention may be used to assemble educational content which is delivered to the student in a non-adaptive manner.

Figure 20:
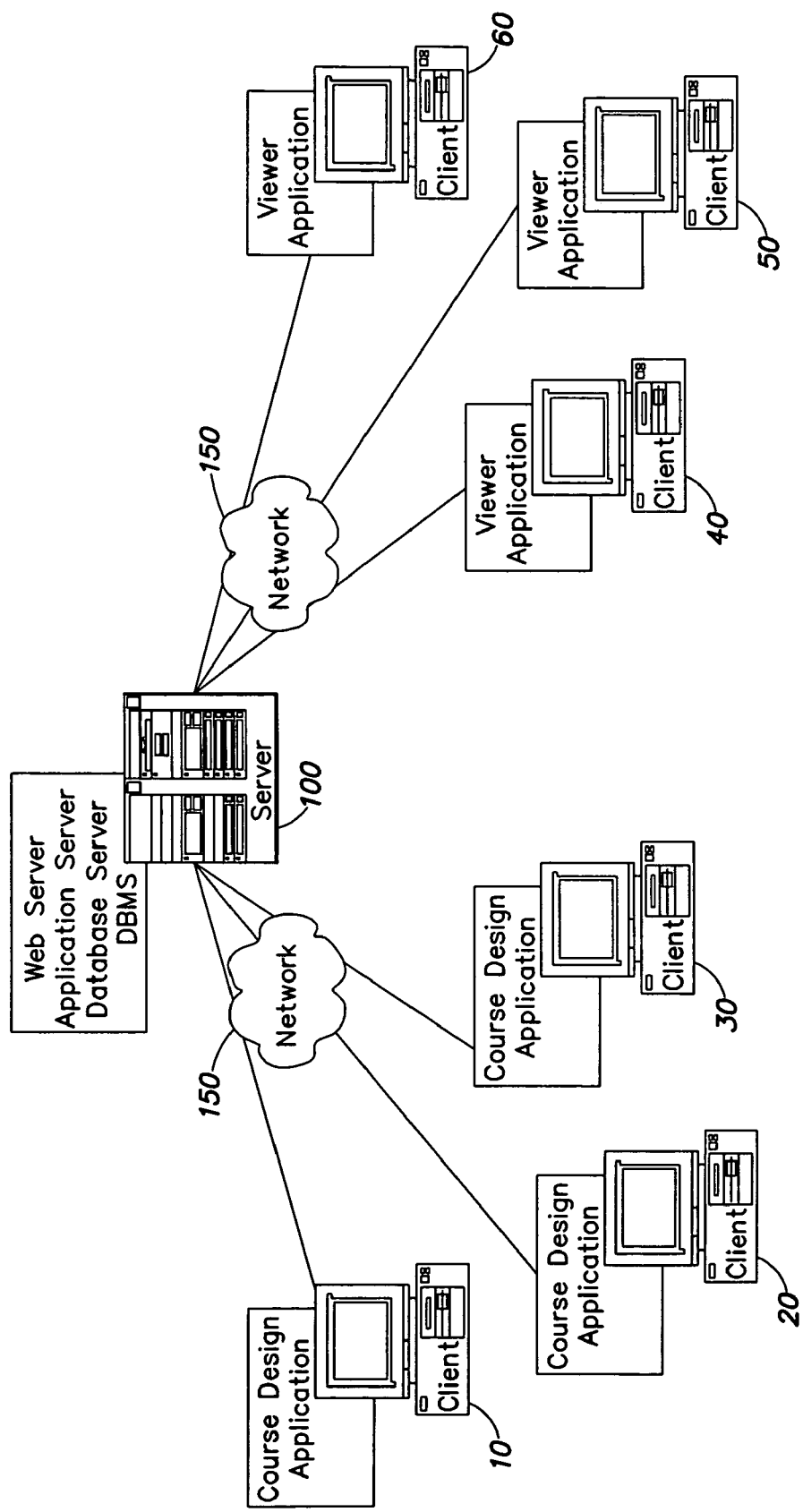
FIG. 20 depicts an exemplary client/server architecture through which the present invention might be deployed.

An illustrative embodiment of such overall architecture, as depicted in FIG. 20, typically includes a server in connection with a network such as the Internet, running web server, application server, database server and database management system applications. In this embodiment the server-based applications receive input via the network from client applications such as the present invention (the "course design application" depicted in FIG. 20), as well as applications executing on other clients (such as the "viewer application" depicted in FIG. 20 and typically used by students). In this embodiment, server processing includes receipt and loading of data including course materials from the present invention, and receipt and processing of data including student viewing patterns and quiz results from the viewer application. The server, in an exemplary mode of operation, will perform the processing required to diagnose the student's learning style and most effective cognitive pathways, and adjust content (i.e., text, graphics, audio, video, animation and simulation) sent to the viewer application accordingly. The overall architecture may be employed to diagnose the student's preferred learning style for the material presented, diagnose the student's preferred media for the material presented, establish a hybrid of learning styles appropriate for the student given the material, facilitate a combination thereof, or perform other processing to more effectively tailor the presentation of material to the student's individual preferences and abilities.

It is important to note that other embodiments may successfully perform this processing using alternative combinations of physical components. For instance, to accommodate larger volumes of user traffic or other needs, server applications may execute on different physical servers that are integrated as a single logical processing unit. Likewise, applications which, in FIG. 20, are shown to execute on separate machines may execute on the same physical computer using either the same or different processors.

The viewer application and server component preferably operate in conjunction to help students build a logical connection between concepts (via the concept layer) and offer multiple paths through which a particular set of concepts might be traversed (allowing students to self-select learning styles and cognitive pathways, and enabling the architecture to discern the selections to adapt content presentation accordingly). The student's response to material and quizzes will preferably define how presentation is adapted. With some embodiments, presentation may be designed to appeal to a mixture of learning styles and cognitive pathways, understanding that students may utilize a hybrid of styles. Other architectural embodiments may instead attempt to discern a dominant style and pathway, and tailor material presentation accordingly.

The present invention may comprise a graphical user interface (GUI) which facilitates gathering educational content and sequencing it according to learning style, and may include a series of back-end modules accessed by the GUI which manage this process. As shown in FIG. 1, the GUI may be a conventional interface developed using VISUAL BASIC, VISUAL C++, or other development tool, and may execute on one or more commercially prevalent operating systems such as MICROSOFT® WINDOWS®, MAC OS, LINUX, etc. The GUI enables interactive creation of a course structure hierarchy (CSH), which is an overall outline of the course and may include a course name, a course objective, one or more concepts, and taxonomies (predefined templates which guide the sequencing of educational course materials) designed to impart the considered concepts based on each of the five (or other number of) defined learning styles.

Figure 21:
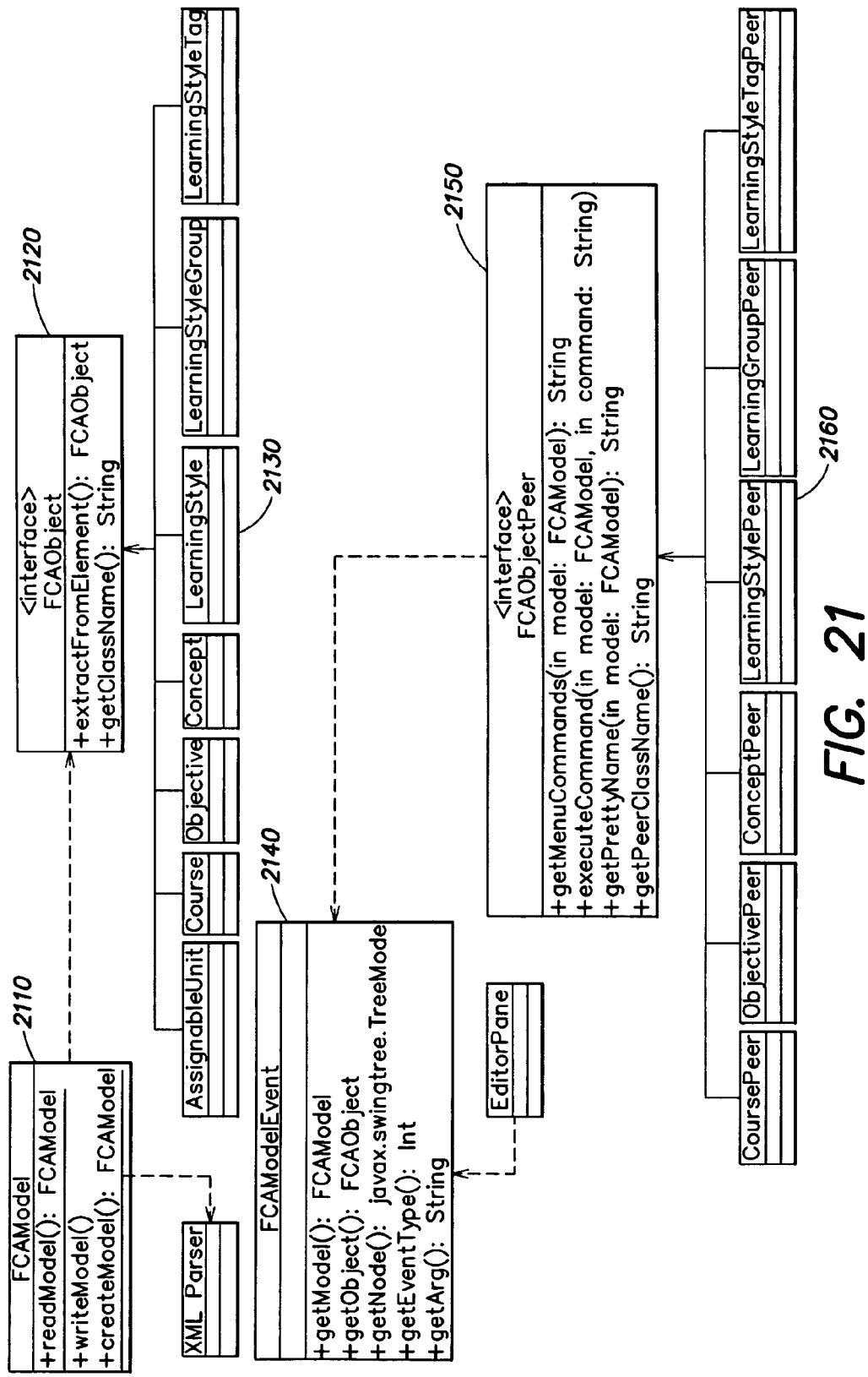
FIG. 21 depicts a unified modeling language-based representation of the interaction between the interface and back-end modules.

Back-end modules (i.e., computer programs and/or data structures) serve primarily to provide the logical framework, as represented by the GUI, for building and publishing the content structure hierarchy. FIG. 21 depicts a Unified Modeling Language-based representation of the interaction between the interface and the back-end modules in one illustrative embodiment. In this representation, FCA (Flexible Cognitive Approach) Model 2110 is comprised of FCA Object 2120 (i.e., the GUI) and a class hierarchy accessed by the GUI including learning style class 2130. In this embodiment class 2130 comprises programmed instructions defining taxonomies in terms of prescribed content structure and presentation sequence. In other embodiments taxonomy specifics may be coded or stored in external files accessed by the module(s) as the GUI guides the user through the process of CSH creation. FIG. 21 also depicts an event handler model, FCA Model Event 2140, comprised of FCA Object Peer 2150 (i.e., the interface event handler) and a class hierarchy including Learning Style Peer class 2160, which, based on the user's input in response to programmed instruction execution defining prescribed taxonomy structure, creates output (as discussed in detail later). In this embodiment, the back-end modules described may be written, for example, in Java to ensure platform independence, using object-oriented programming techniques to provide for easier maintenance. In other embodiments other languages or programming techniques may be employed.

The process whereby a course structure hierarchy is created will be illustrated with an example. In this example, the user (e.g., an educator) will create content to teach one or more concepts to a student that exhibits the Apprenticeship learning style. As discussed, this learning style is usually most engaged when presented with educational materials in a "building block," step-by-step, procedural manner. Individual steps are typically presented using media objects which include text (explanations, descriptions, examples), graphics or animated illustrations (explanations, descriptions, illustrations, demonstrations, examples), audio (explanations, examples), and/or video (explanations, examples).

As depicted in FIG. 1, to begin the development of the CSH, the user may, via the GUI, provide information such as a course name, and one or more objectives 110. The GUI embodiment is a standard Windows-based interface also including Menu Options 120, and a General Properties Box 130 defining the course and its identifier within the system. Within each objective shown, the user may provide a series of concepts known as a concept layer (not depicted) within each objective. The concept layer is designed to achieve the objective by imparting a finite set of core and derived concepts. In most cases, a course designer will use core concepts to initiate the layer, and the presentation will build to present more complex or derived concepts.

Figure 2:
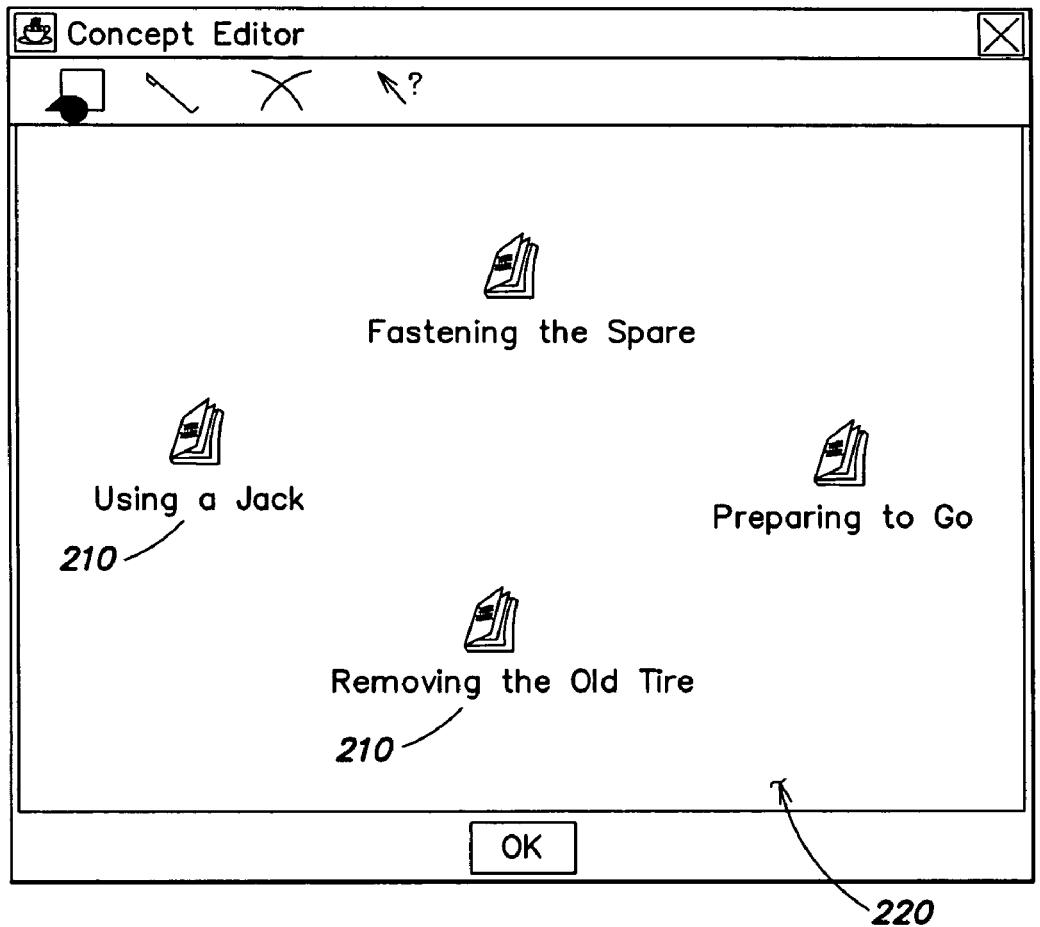
FIG. 2 depicts a screen display for an illustrative system embodiment showing concepts represented as icons for input of interdependencies.

FIG. 2 depicts a subsequent screen in this embodiment in which the system depicts created concepts (collectively the concept layer) as icons 210 (in this case, books). In this embodiment, concepts are depicted as icons within a separate interface window 220, which may also be a standard Windows-based interface.

Figure 3:
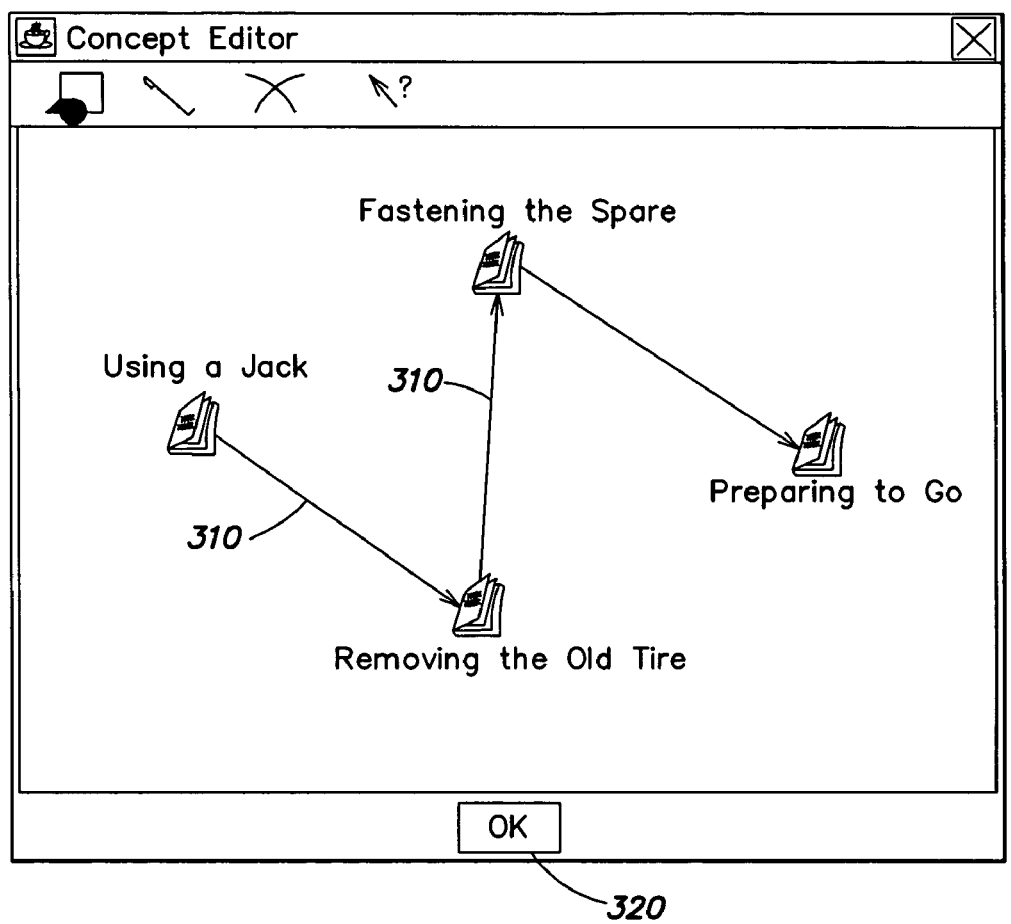
FIG. 3 depicts a screen display for an illustrative system embodiment showing user's input of concept interdependencies.

FIG. 3 depicts the same separate interface window, which allows the user to input concept interdependencies and prerequisites displayed. In the embodiment shown, these are represented by arrows 310 (note: given that the input tool is a graphical user interface, these arrows may be considered output as well). In other embodiments, the GUI may accept as input and employ different representations of concept interdependencies. The arrows will define the order in which the concepts are presented to the student to comprise the concept layer. The user may click the "OK" button 320 on this separate interface window to indicate that all appropriate interdependencies and prerequisites have been established.

Figure 4:
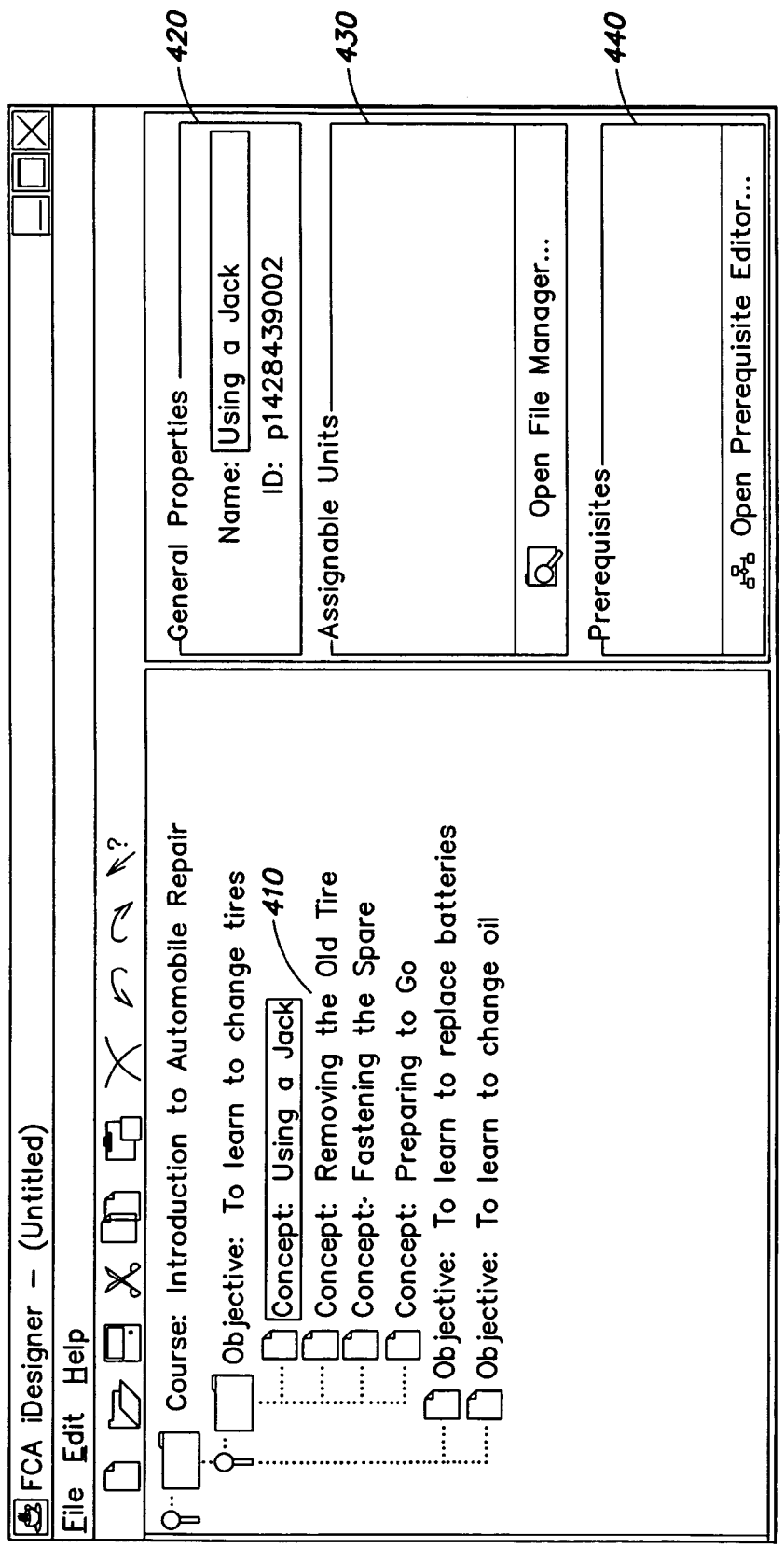
FIG. 4 depicts a screen display for an illustrative system embodiment showing the concept layer.

In this embodiment, when the user clicks the OK button, the interface reverts to the display shown in FIG. 4, which depicts Concept Layer 410. Concept layers may present individual or multiple concepts in linear sequence, in a user-defined order, or present a subset in parallel (i.e., with equal importance), so that no restrictions are imposed by the system on content sequence. In most embodiments, however, the concepts will form a tree structure(s) with relatively well-defined sequence(s). Some system embodiments will allow the user to edit or delete selected concepts within the layer, and will maintain or modify concept relationships depending on predefined instructions.

FIG. 4 also depicts three function boxes (420, 430, 440) that, in this embodiment, allow the user to modify various characteristics of the concept layer. General Properties Box 420 allows user modification of the selected concept's name, and displays a reference identifier assigned by the system for that concept. Assignable Units Box 430 allows the user to invoke the File Manager (discussed in more detail below) to assign content assets to the selected concept. Prerequisites Box 440 allows the user to modify concept interdependencies, as may also be done using separate interface window 220.

Figure 5:
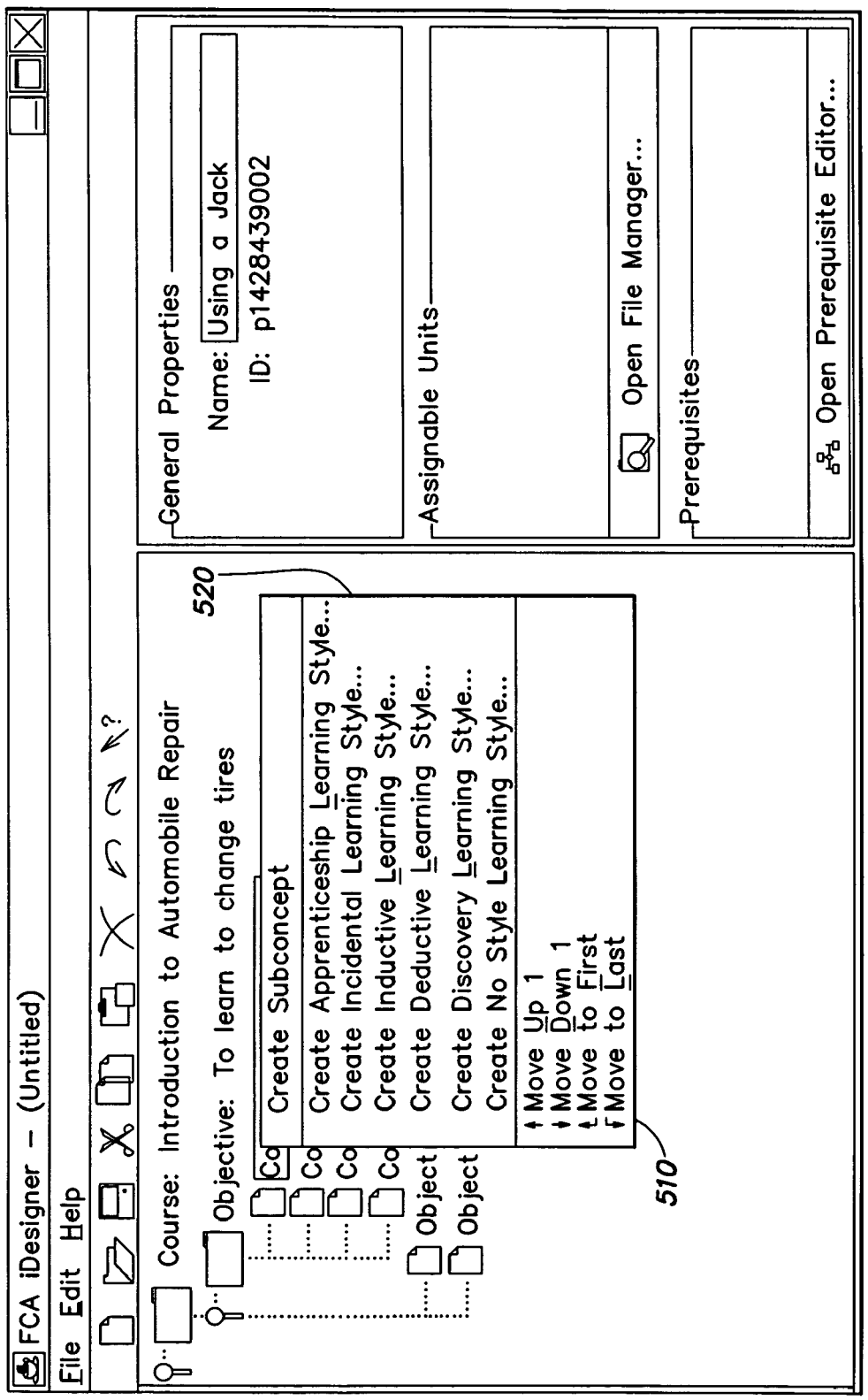
FIG. 5 depicts a screen display for an illustrative system embodiment showing taxonomies available via pull-down menu.

As depicted in FIG. 5, for each concept, the user may next begin defining and structuring the course utilizing predefined taxonomies, which can be thought of as templates for assembling bodies of educational material specific to student learning styles and cognitive abilities (discussed in greater detail later). The user may do this by selecting a specific taxonomy from among one or more predefined taxonomies shown in pull-down menu 510. In the menu, taxonomies are selected by passing the cursor over Taxonomy Selections 520 and clicking the selected item. Each item prompts the user to create material for a particular (or no, as shown by the last element in the list) learning style. Upon the user's selection of a particular taxonomy, in certain embodiments, the system accesses a Java class which defines and codifies taxonomy properties. In these embodiments, the prescribed structure (i.e., the sequence of steps) and content type for each step is defined within the class. Also in these embodiments, the class may be modifiable to allow a new learning style/taxonomy to be added, in order to afford the system extensibility. Further, upon modification of the class the new taxonomy may be available as a Taxonomy Selection 520 via pull-down menu 510. In this example, the user's selection of the Apprenticeship learning style may trigger code (i.e., programmed instructions) which determines that this taxonomy includes a "step" Trigger element, followed by prescribed Qualifier elements including "description," "example," "exposition," and "procedure". The GUI may then prompt the user to provide content assets that conform to each prescribed element, learning step, or step group, depending on the user's preference. The user may also elect to add more Qualifier elements than the taxonomy prescribes, may substitute for suggested Qualifier elements, and/or may omit any or all suggested Qualifier elements. The process by which the user selects content assets for use, and determines the correct size of content assets (both in terms of physical file size, and time to view) may be manual, depending on the embodiment. In some embodiments, the system might prompt the user to "size" content according to predefined standards, which may or may not conform to various industry or educational standards.

Figure 6:
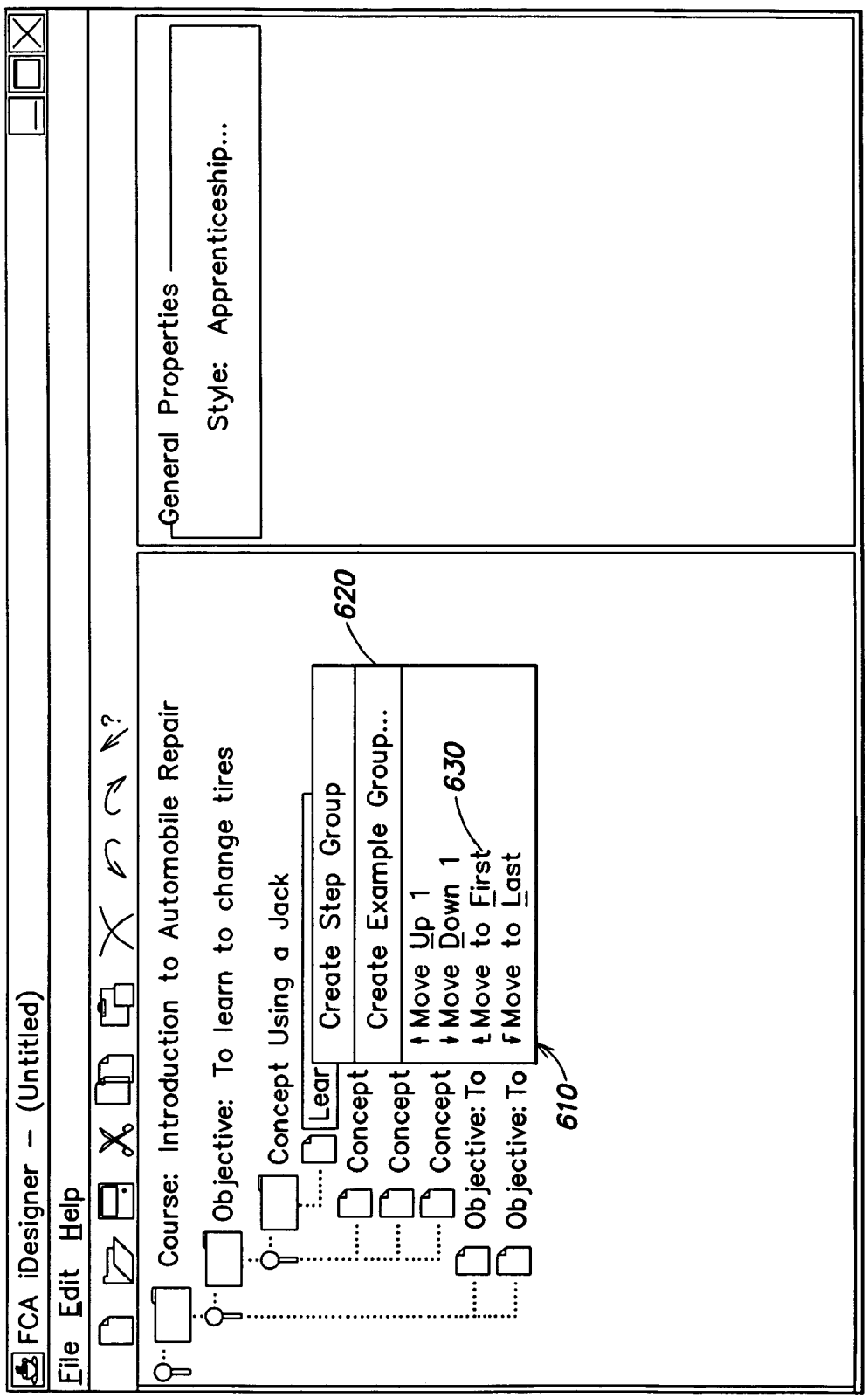
FIG. 6 depicts a screen display for an illustrative system embodiment showing concept groups prescribed by taxonomy.
Figure 7:
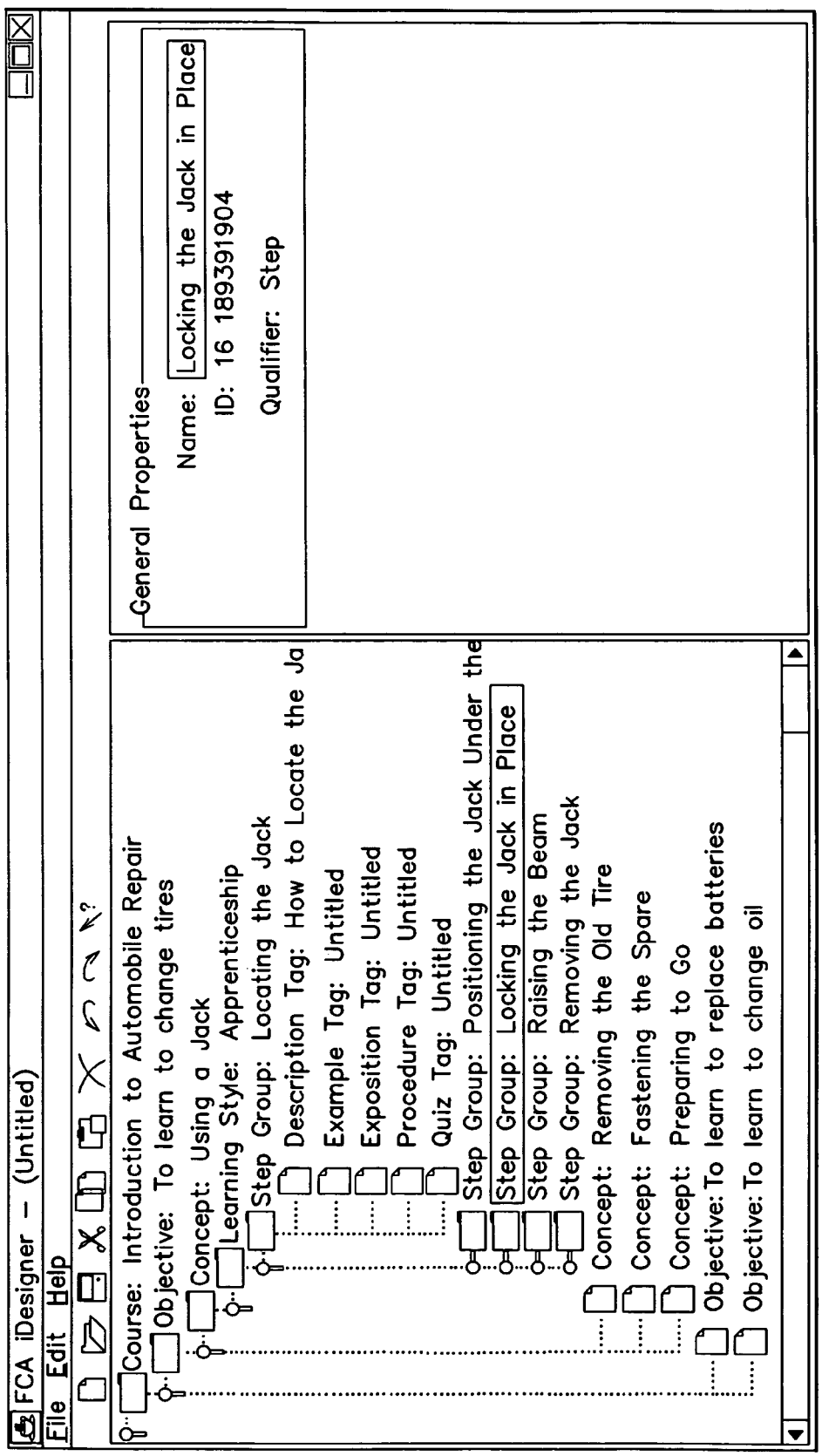
FIG. 7 depicts a screen display for an illustrative system embodiment showing concept groups prescribed by taxonomy, after further organization by user.

As depicted in FIG. 6, the system, in pull-down menu 610, may prompt the user to provide content according to the prescribed structure (prompting the user for "step" or "example" content groups, for example, as prescribed for the Apprenticeship learning style and shown in qualifier selections 620), and/or organize the sequence of groups using organization selections 630. FIG. 7 depicts these learning step groups, and the associated subordinate learning steps, after this organization has been completed.

Figure 8:
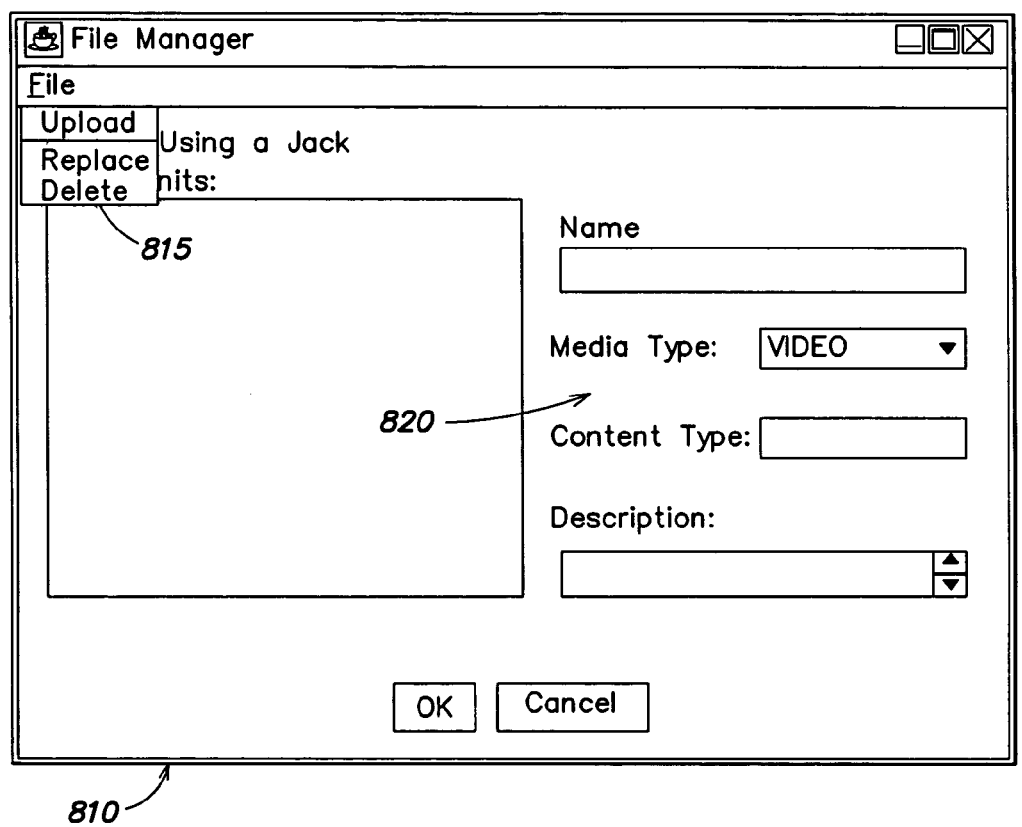
FIG. 8 depicts a screen display for an illustrative system embodiment showing the dialogue box used to select content upload functionality.

As depicted in FIG. 8, the GUI then enables the user to assign (i.e., associate) electronic content assets, in the form of stand-alone files of various formats (including text, audio, video, animation and simulation interfaces), to each taxonomy step. In the embodiment depicted, a dialogue box 810 is used to guide the user through the process of adding, linking, and uploading files. From within the dialogue box, the user may also upload, replace, and delete content assets, as provided for in menu 815. Once a file is selected for upload (as described below), dialogue box 801 also allows the user to specify the file name, media type, content type, and description to using parameter settings 820.

Figure 9:
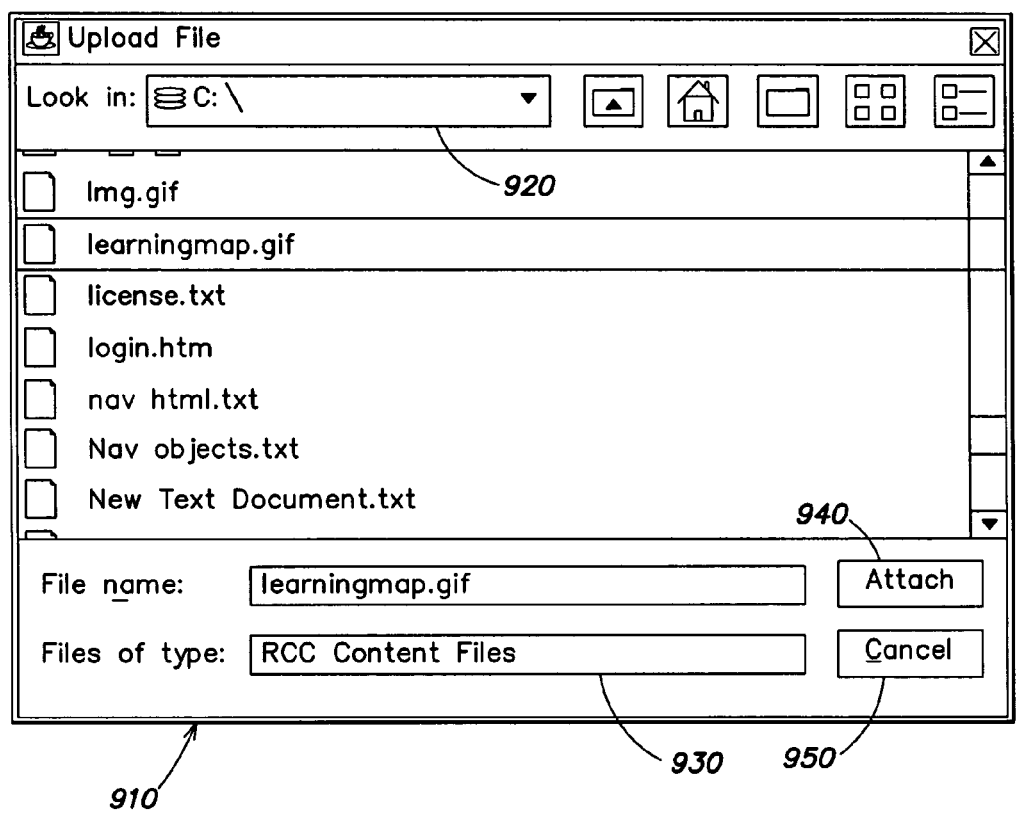
FIG. 9 depicts a screen display for an illustrative system embodiment showing the dialogue box used to select a file for upload.

FIG. 9 depicts pop-up box 910 invoked by selecting "upload" from menu 815. Pop-up box 910 allows the user to select the file to be uploaded. Depending on the user's network access at the time the "upload" feature is invoked, the system may allow the user to select files stored on the user's hard drive(s) or at remote network locations. The location indicator 920 denotes the location of the file. The user may select for upload files of various types, including, but not limited to, text, graphics audio, video, animation, and simulations, and may filter the files viewed in a particular location using file type filter 930. Once the user completes the selection, clicking attach button 940 initiates the physical transfer of the selected file. The user may also cancel the selection, or the physical transfer, by clicking the cancel button 950.

Figure 10:
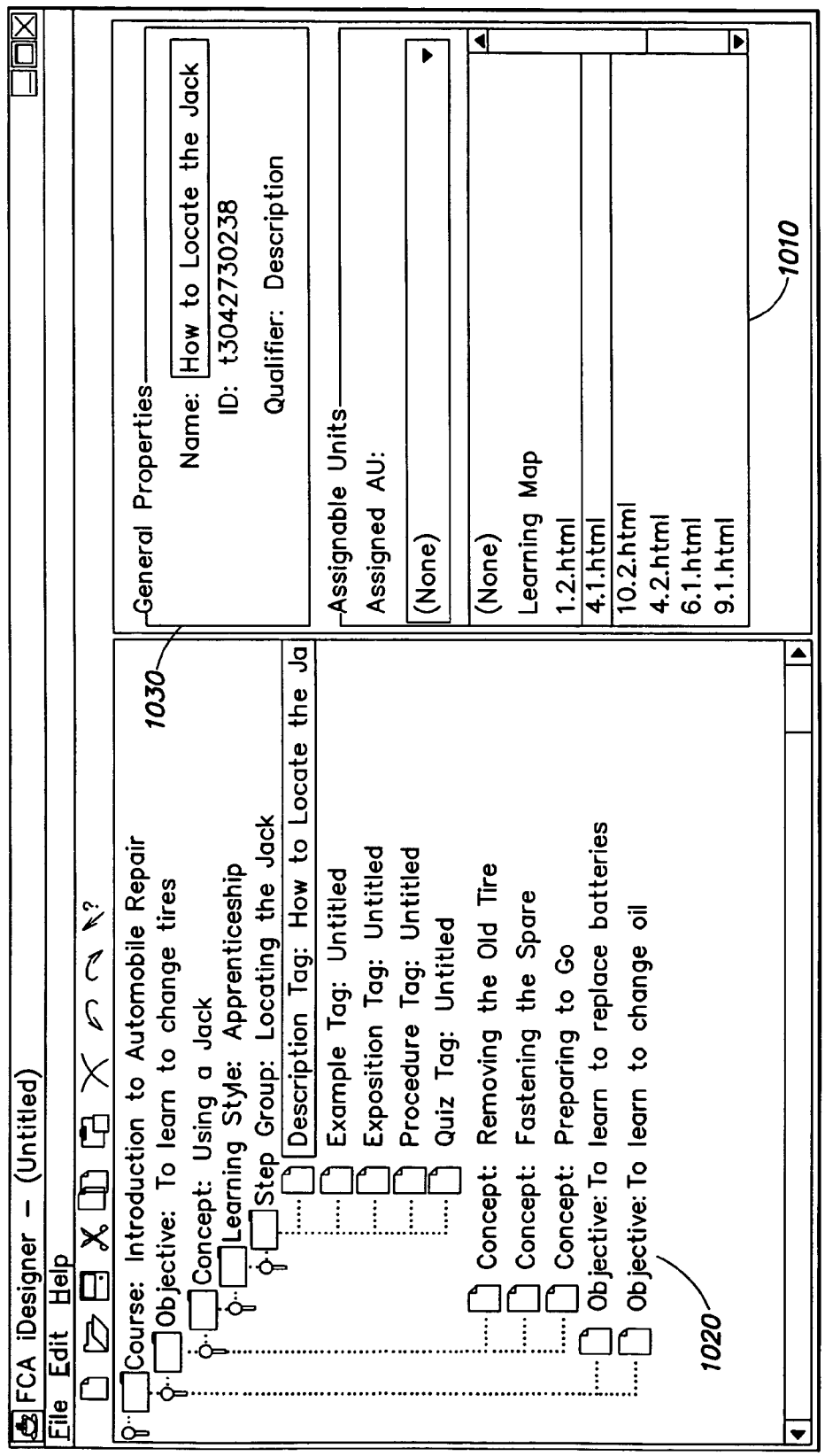
FIG. 10 depicts a screen display for an illustrative system embodiment showing the dialogue box through which the user associates a file with a particular step in the course structure hierarchy.

Once the user selects and attaches a file, the system prompts the user to associate the file with a particular element, as depicted in FIG. 10. In the example shown, the user is attaching content asset "4.1.html," as shown in association menu 1010, with selected course structure hierarchy element "How To Locate The Jack," indicated in both CSH menu 1020 and properties menu 1030. Once uploaded, content assets may, depending on the system embodiment, become shareable by multiple taxonomy steps, concept layers or course structure hierarchies. In addition, content assets may reference other content assets within the system. For instance, this HTML page "4.1.html" may reference embedded graphic elements.

In certain embodiments, taxonomies may provide for the association of multiple content assets, representing multiple file types (e.g., text and video), within a step group and element. In these embodiments, the decision as to which content asset is presented to the student may be made by a complementary system or component (such as the server-based content presentation component discussed in the foregoing), or an embodiment of the present invention, and may be random, based on prerequisites, or depend on other factors.

Figure 11:
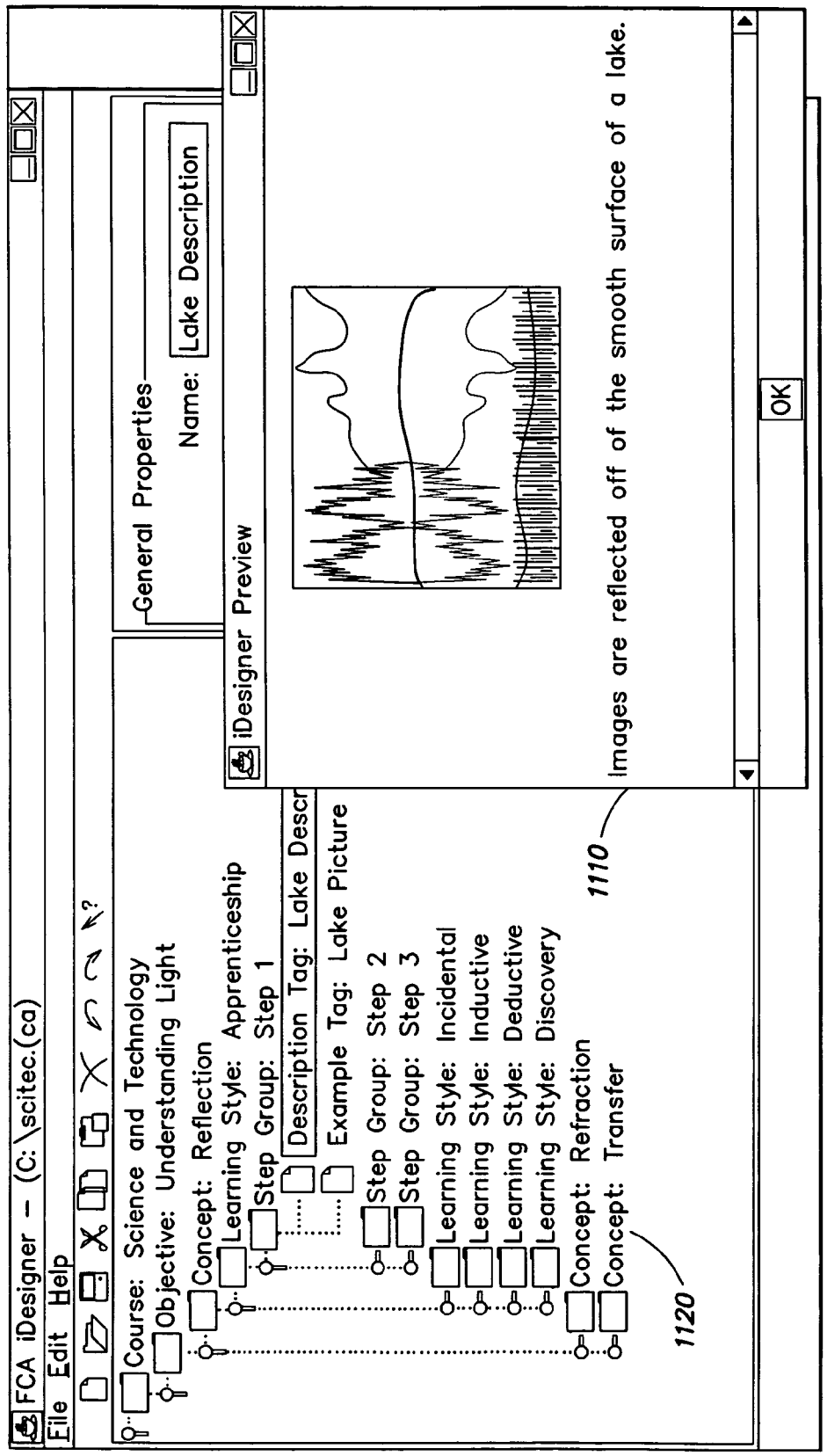
FIG. 11 depicts a screen display for an illustrative system embodiment showing the dialogue box through which the user may preview presentation of a file.

The system may enable the user to preview the presentation of individual content assets as it will be viewed by the student. In the embodiment depicted in FIG. 11, the system employs a pop-up window 1110 to accomplish this preview (launched, in the embodiment depicted, by double-clicking on the selected element in CSH menu 1120), but this preview function might also be accomplished using a separate application window, with a separate application altogether (for example, employing Adobe Acrobat, MS Windows Media Player, or other application), or another method, and may be invoked using another method as well. Other system embodiments may also incorporate tools to edit content assets provided in other formats (such as video, for example) to make them more appropriate for presentation on the computer (by shortening them, for example). These tools may be third-party applications, or may be provided as an integrated component within this system.

Figure 12:
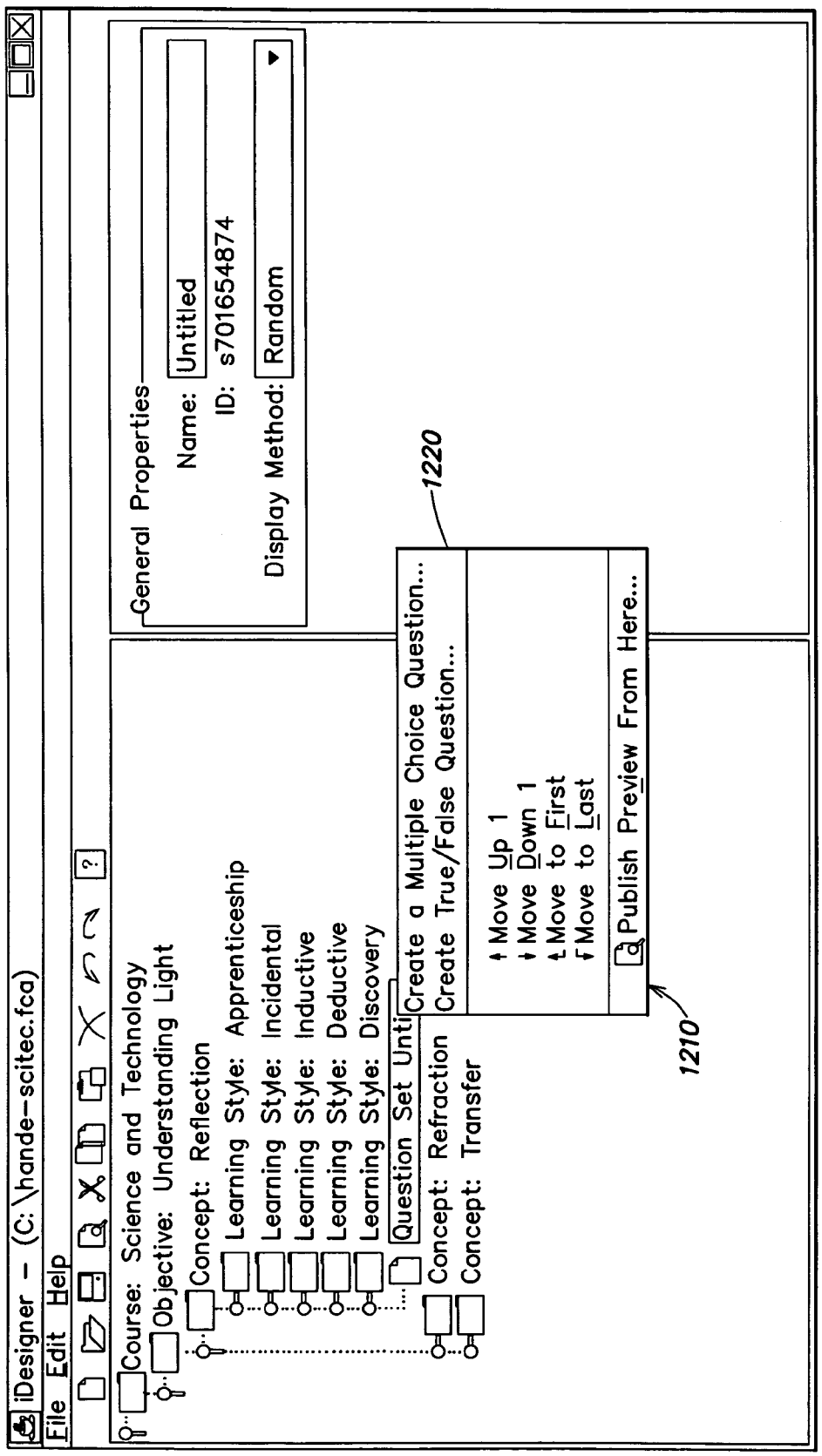
FIG. 12 depicts a screen display for an illustrative system embodiment showing a menu through which the user selects the quiz type.

After defining and organizing the content assets for the considered concept, the user may prepare a quiz for students to test their knowledge of the subject matter. In the illustrative embodiment depicted in FIGS. 12-18, quiz creation is managed by back-end modules, and represented by the GUI, that allow the user to specify quiz type, individual questions, answers to questions, and feedback provided to the student. In other embodiments the quiz may be provided by the user in the form of a text file. Depending on the embodiment, the system may allow the creation of multiple-choice, true-false, concept-ordering, concept-matching, or other style of question set, and/or combinations thereof. In the embodiment shown in FIG. 12, a menu 1210 is employed to facilitate the user's selection of the question set type, with which the user selects from question type selections 1220. When the user selects a type, back-end module code may be invoked which causes a type of template for the question set to be displayed to the user. In the embodiment depicted, logic defining creation of a multiple-choice quiz will be invoked.

Figure 13:
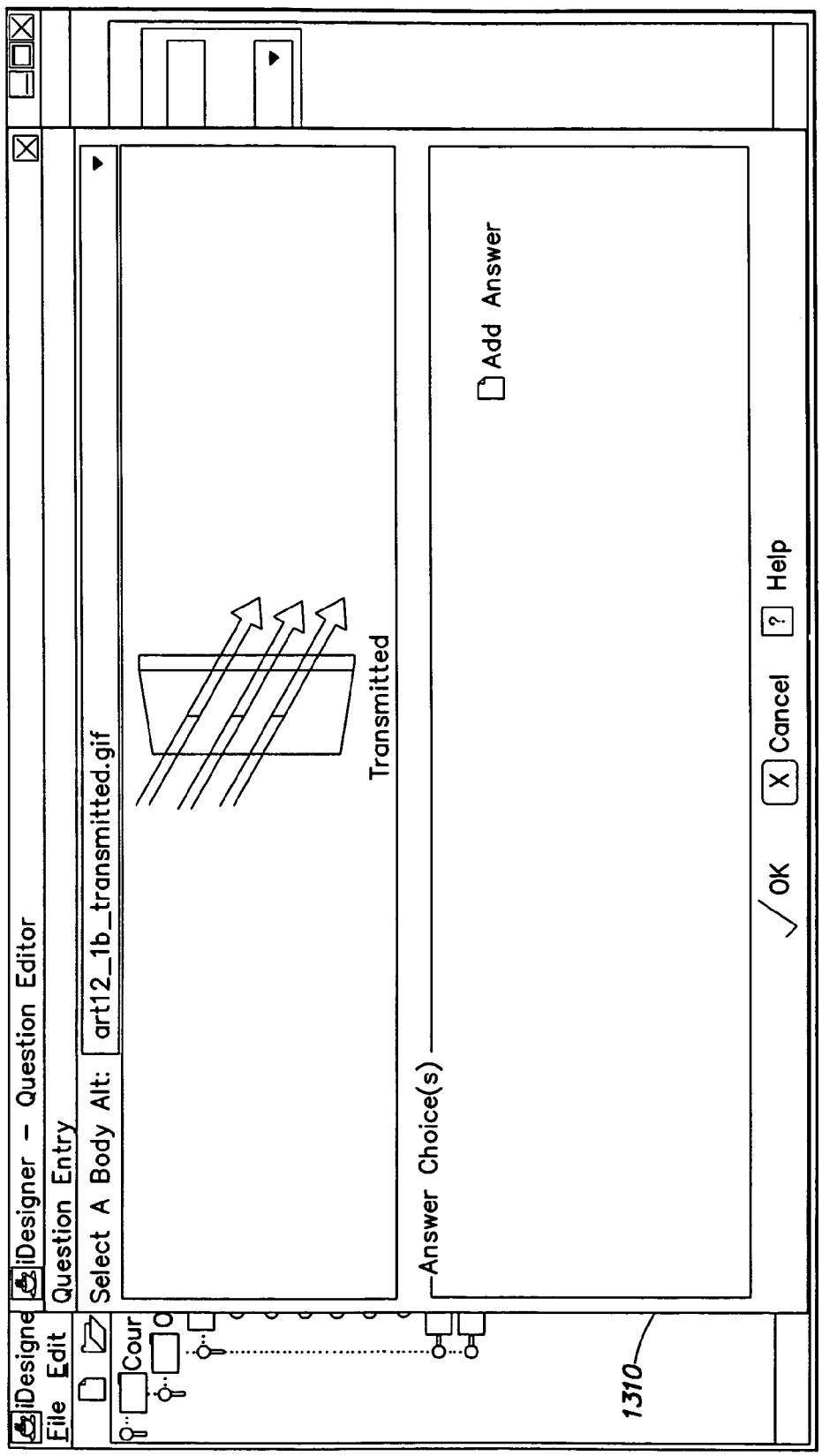
FIG. 13 depicts a screen display for an illustrative system embodiment showing a pop-up box through which a user may reference a file to create a quiz question.
Figure 14:
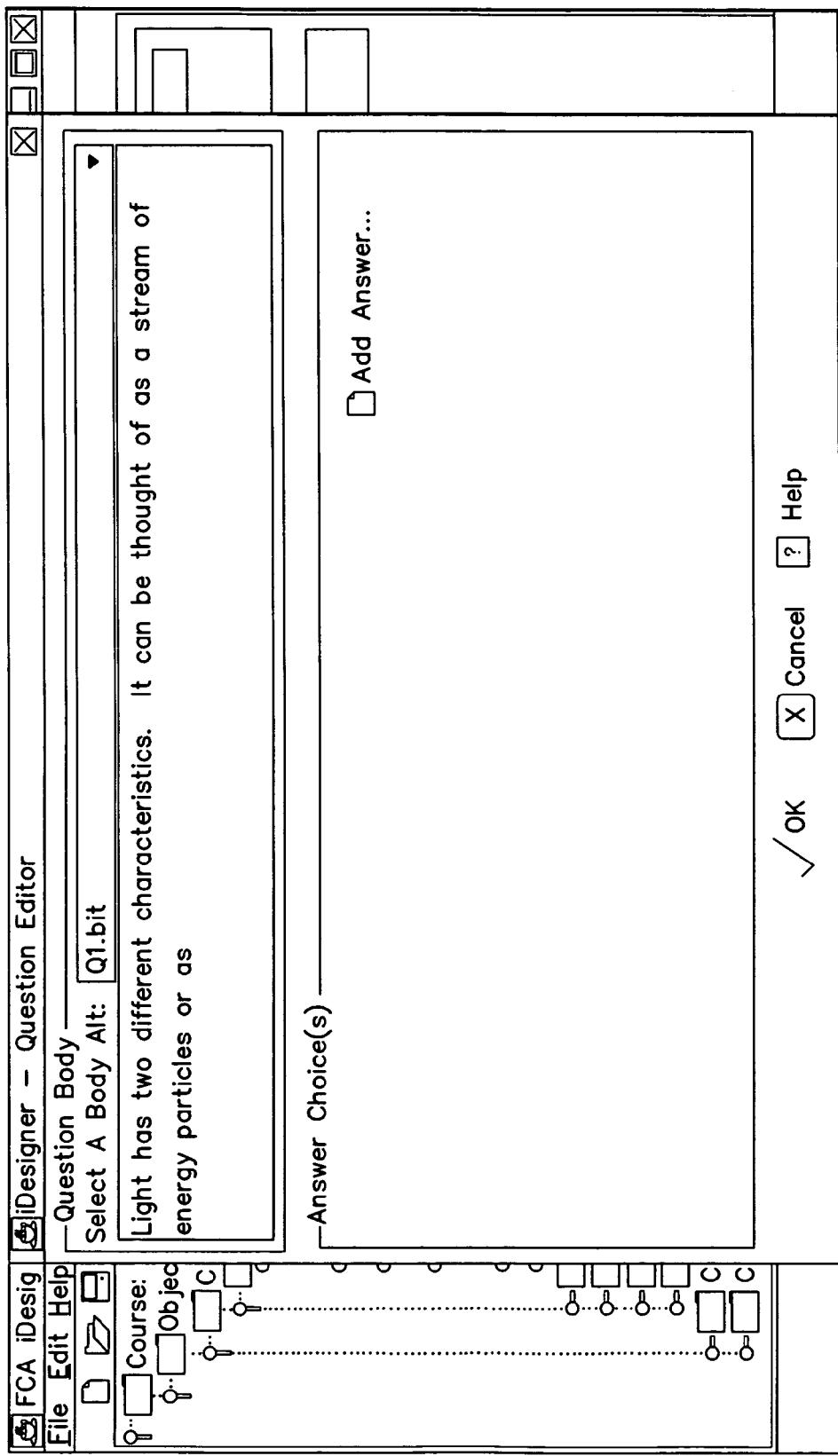
FIG. 14 depicts a screen display for an illustrative system embodiment showing the dialogue box through which the user edits the text of a quiz question.
Figure 15:
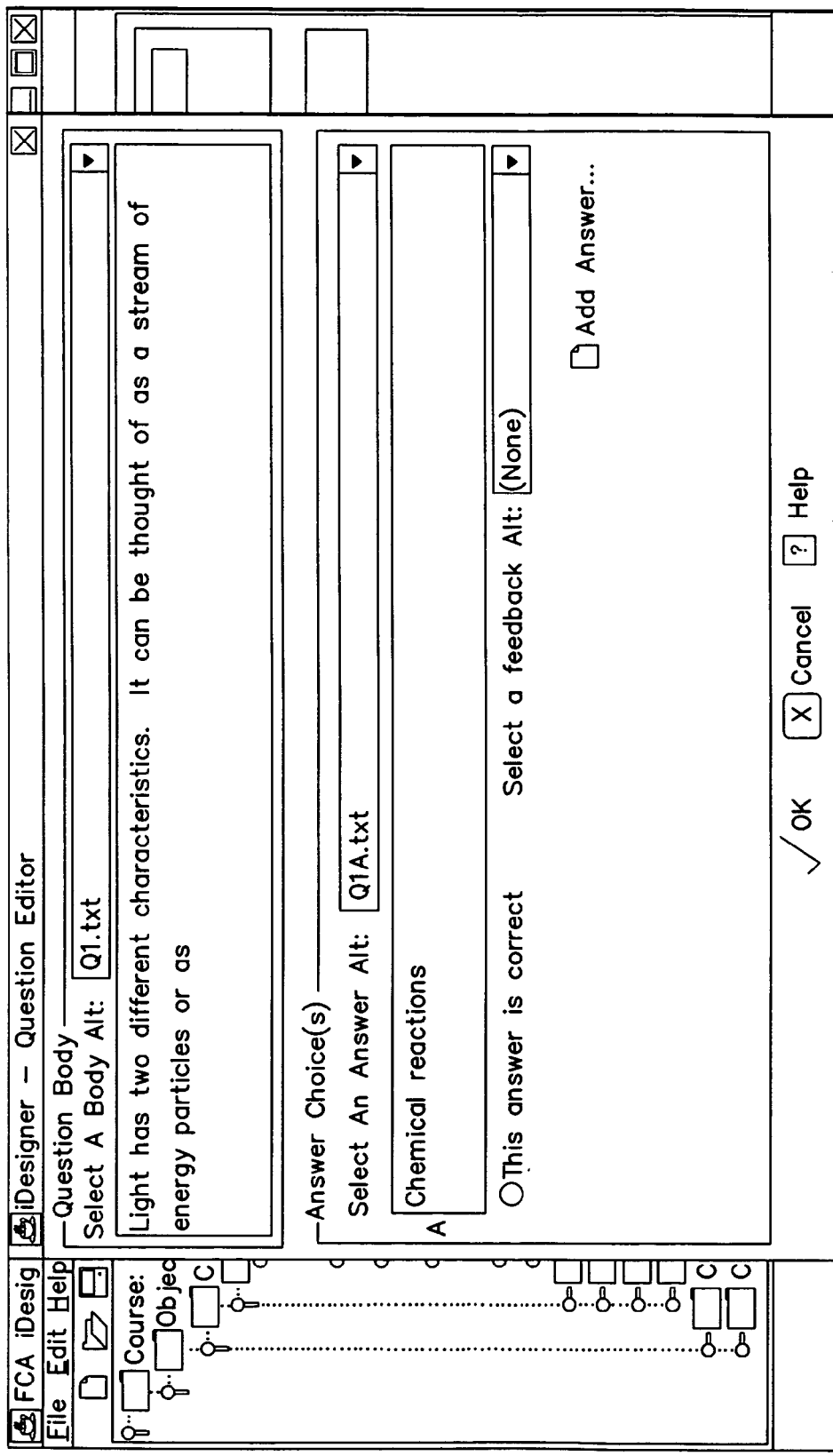
FIG. 15 depicts a screen display for an illustrative system embodiment showing a dialogue box through which the user supplies one or more answers to a quiz question.
Figure 16:
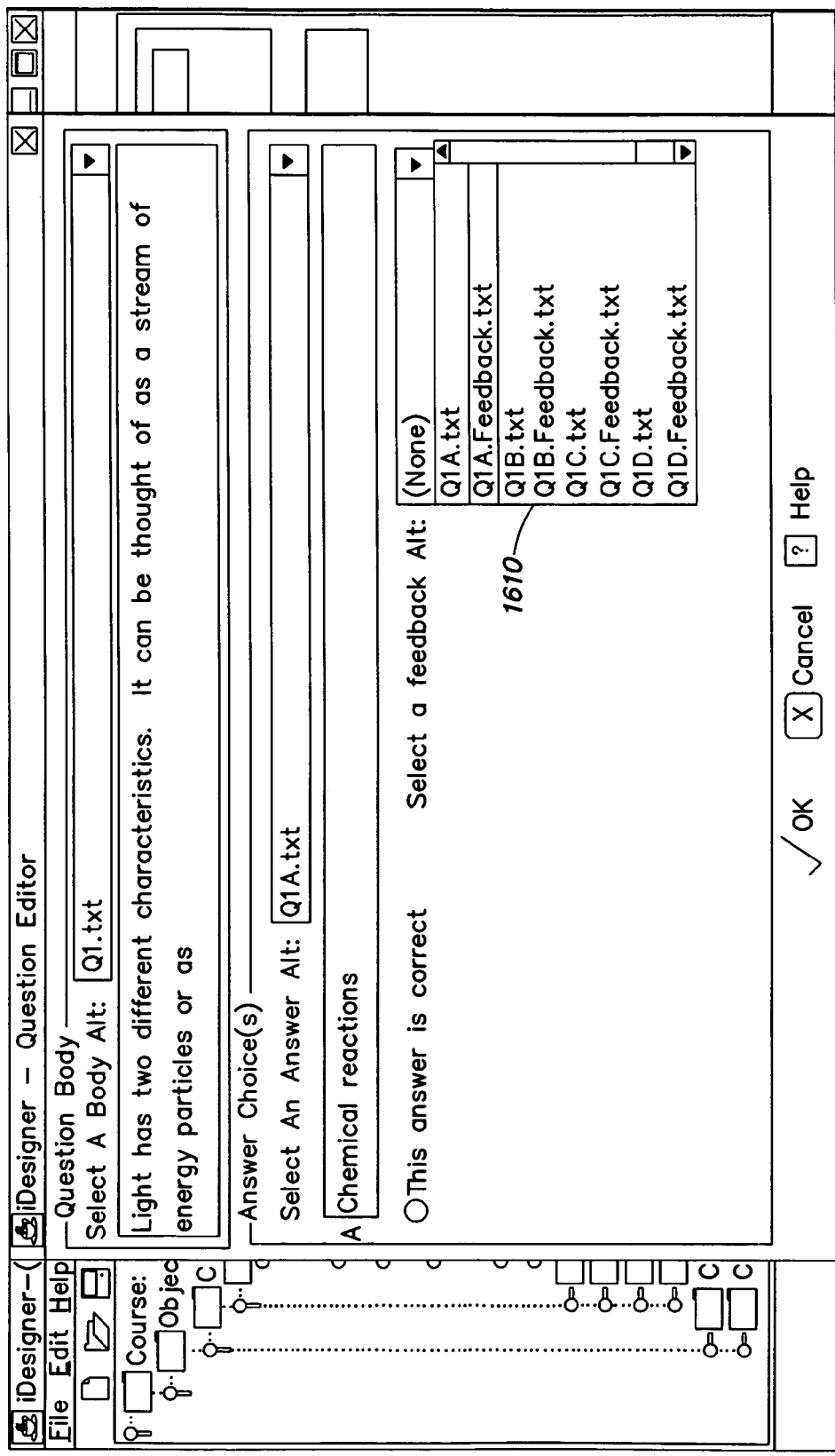
FIG. 16 depicts a screen display for an illustrative system embodiment showing a dialog box that allows the user to select a message for display upon receiving a particular answer from the student.
Figure 17:
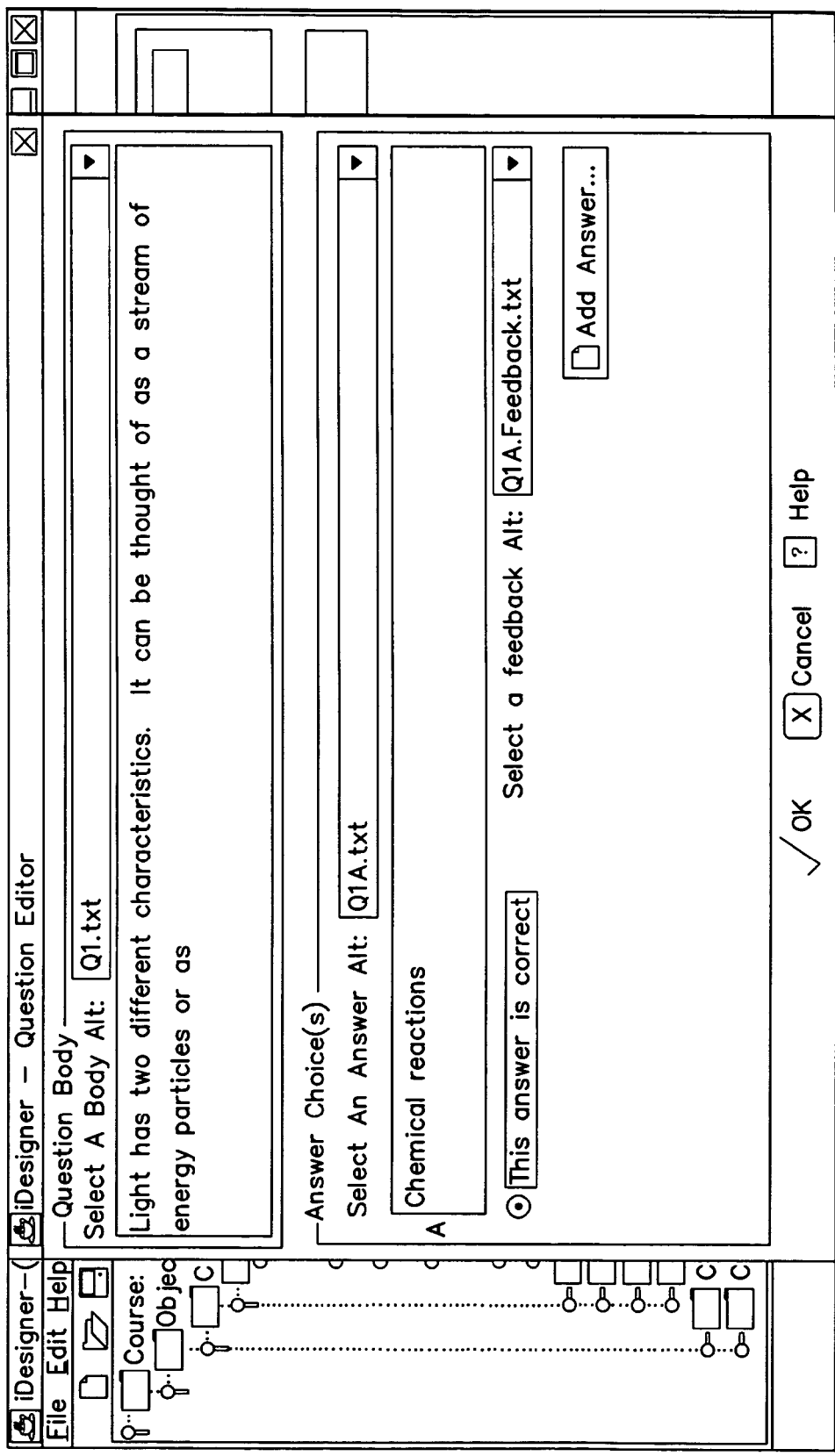
FIG. 17 depicts a screen display for an illustrative system embodiment showing the dialogue box through which the user selects the correct answer to a quiz question.
Figure 18:
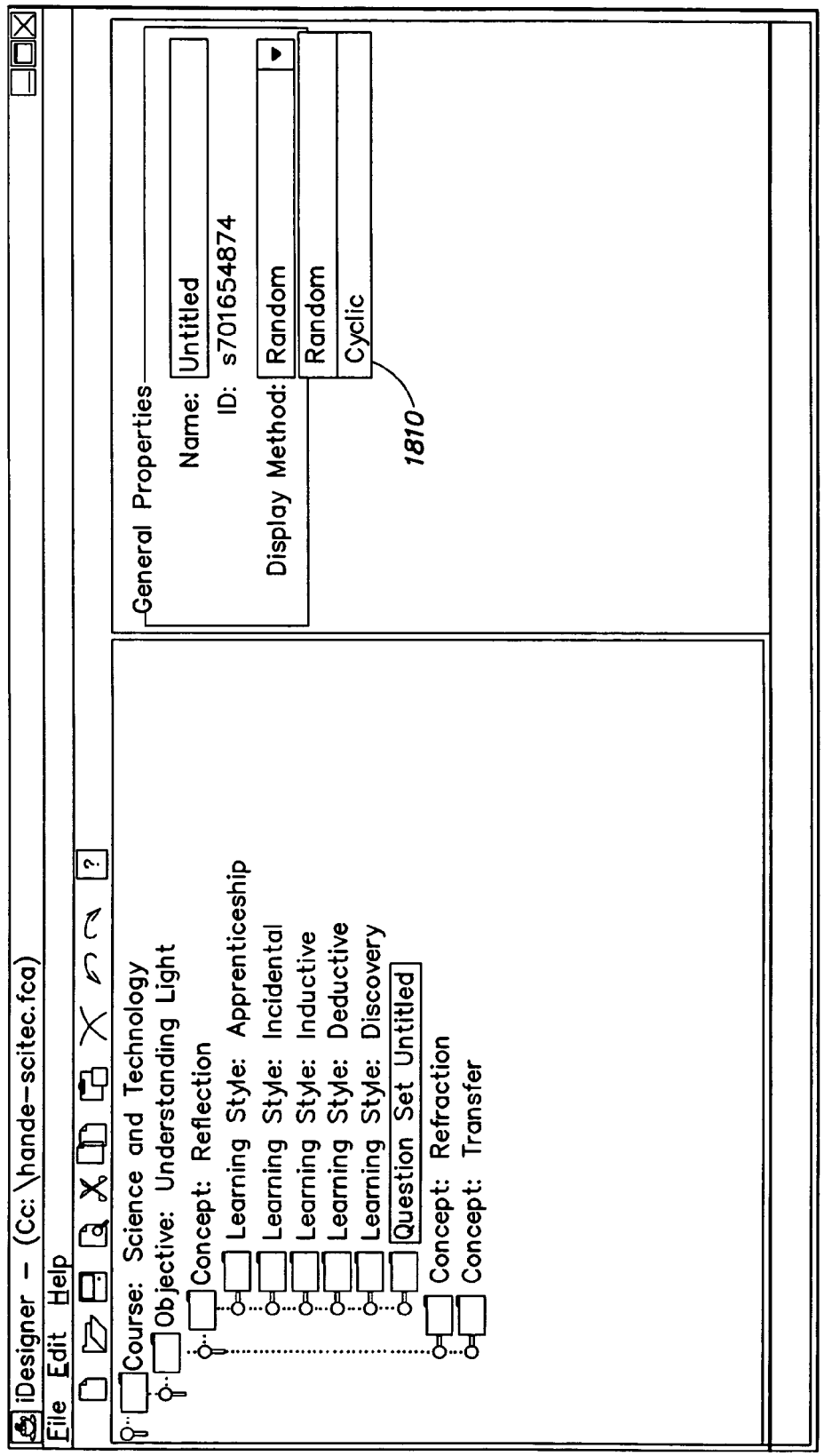
FIG. 18 depicts a screen display for an illustrative system embodiment showing a dialogue box through which the user may select parameters for question display.

Once the question set type is selected, the illustrative system embodiment shown in FIG. 13 allows the user to double-click on a question to reference a particular content asset (as displayed in pop-up box 1310) to produce a question. FIG. 14 depicts another question as referenced in the course text and allows the user to edit that text using question editor box 1410. Clicking OK on question editor box 1410 takes the user to subsequent version of question editor box 1510, shown in FIG. 15, which allows the user to supply multiple answers to the question, either by entering them manually or by referring to a particular content asset for sample text. FIG. 16 depicts a dialog box which allows the user to select a message 1610 (which, in the example shown, is stored in a file) to be communicated to the student upon providing the answer selected. FIG. 17 again depicts question editor box 1710, which further allows the user to designate the correct answer for the question. The process depicted in FIGS. 13-17 may then be repeated by the user for each question to be posed on the quiz. FIG. 18 depicts Display Method Menu 1810 through which the user may specify parameters, if desired, for question display (allowing the user, for example, to specify random display of questions). Those skilled in the art will appreciate that many alternative methods may be employed to enable the user to create, edit, and publish quiz materials other than that which is depicted in FIGS. 13-18.

In certain embodiments, as the user updates the CSH and assigns content assets to it, the back-end module(s) may create output in the form of a manifest file, which is a file in XML, text, or other format, describing the course structure (according to the taxonomies provided for by the user), and associated content (which may be defined by reference identifiers assigned sequentially by the modules). In other embodiments, the manifest file may be produced upon user completion of the CSH. The manifest file serves at least two purposes: first, it may be accessed by the system to identify the areas of the course structure hierarchy that the user has not yet completed, in the form of a course completion chart; second, it may be transmitted to complementary system components adapted to interpret the file, such as a server-based component that facilitates presentation or web-based publication of the educational material to students. The manifest file may also be generated to comply with various standards in the educational field, so that the output of this system may be used with a variety of other complementary standards-conforming components.

An example of a manifest file is provided below. The file below is formatted in XML and defined by the Apprenticeship learning style ("learningstyle style") and taxonomy. The file illustrates the use and identification of content groups within the learning style ("learningstyle group id"), each given a "name" and "qualifier" identifying them as steps designed to impart the material. Each group member is further broken down into a series of "learningstyletag" elements, defined with a reference identifier that may be used by other tags ("aureference"), a database identifier ("id"), and "name" and "qualifier". Tags are individual content assets displayed to the student. The file below, then, describes three content groups presented to the student: Step 1 (identified as "g5951927761", and encompassing Description and Example tags), Step 2 (identified as "g6029509325", and encompassing an Exposition tag), and Step 3 (identified as "g2021129181", and encompassing Description, Example, and Quiz tags).

```
<learningstyle style="Apprenticeship">
  <learningstylegroup id="g5951927761" name="Step 1" qualifier="Step">
    <learningstyletag aureference="a1770590417" id="t5951927761" name="Lake Description" qualifier="Description">
    </learningstyletag>
    <learningstyletag aureference="a5525033939" id="t5951927761" name="Lake Picture" qualifier="Example">
    </learningstyletag>
  </learningstylegroup>
  <learningstylegroup id="g6029509325" name="Step 2" qualifier="Step">
    <learningstyletag aureference="a2443151387" id="t6059254036" name="History of Light" qualifier="Exposition">
    </learningstyletag>
  </learningstylegroup>
  <learningstylegroup id="g2021129181" name="Step 3" qualifier="Step">
    <learningstyletag aureference="a1476514092" id="t2021129181" name="Untitled" qualifier="Description">
    </learningstyletag>
    <learningstyletag aureference="a6504174175" id="t2021129181" name="Laser Picture" qualifier="Example">
    </learningstyletag>
    <learningstyletag aureference="a5411144183" id="t2021129181" name="Reflection Quiz" qualifier="Quiz">
    </learningstyletag>
  </learningstylegroup>
</learningstyle>
```

Certain system embodiments may also generate a metadata table containing a series of entries (known as metatags) for each element in the course structure hierarchy. This table may also be generated as the CSH is being created by the user, or after the CSH has been completed. The table may be a text file, a table formatted to comply with a specific database management system, or may assume another format altogether. The metadata table may be passed with the course structure hierarchy itself to a complementary system component, such as the server-based component for facilitating content presentation discussed in the foregoing. It may serve as a comprehensive descriptor enabling more efficient searching, classification, and retrieval of content assets in by the complementary component for adaptive presentation of material to the student. In certain embodiments, each entry in the metadata table is a descriptor or indication of a content asset's property used to further describe the asset, or make explicit a relationship between the asset and one or more other assets in the system. Also, in certain embodiments, metatags may utilize standard values to describe each content asset's file type: VIDEO (for .rm, .mpeg, .mov, .avi files), AUDIO (for .wav, .au, .rm files), TEXT (for .html, .htm, .txt files), IMAGE (for .gif, .jpg, .jpeg, .png files), and FX (for .flash, .class, .gif files). Other embodiments which utilize metadata may employ an alternate content asset description scheme. An illustrative example of metadata created for a course on Maritime Navigation is shown in FIG. 19.

Once the CSH and related manifest and metadata files (if appropriate) are completed, depending on the embodiment, all materials are typically published to one or more complementary components or systems which facilitate the actual presentation of content to students. Certain embodiments may allow alteration of the CSH, manifest, or metadata file after "publication", and may utilize wireless markup language (WML) to allow the user to do so via wireless browsers, WML-enabled cell phones, personal digital assistants, or a combination thereof to do so, so that educators can modify material presentation "on the fly."

The course material description scheme inherent in the metadata structure may allow it to be utilized outside the confines of the system. For instance, a content provider may use a version of metadata to create a "draft" version of a course structure hierarchy, which might then be imported into certain embodiments of the present invention for further manipulation and editing (to provide for alternate learning styles and/or cognitive pathways, for instance).

In some embodiments, metadata and the overall content referencing and type identification scheme inherent therein will enable users to employ the system to populate a particular course structure hierarchy in an automated fashion, using content assets provided in a separate repository. The user may create a course structure hierarchy for a given subject without content assets (i.e., defining only the taxonomies desired, not the content assets to be associated thereto), and the system may create queries to extract the desired content from the repository (which may have been designed and indexed for this purpose). In these embodiments, the to repository will typically make available a reference index indicating how to access subject matter stored (for example, codifying subject matter), so that relevant course materials are extracted when the queries are executed. The system may further allow the user to execute queries before designing the course structure hierarchy, so that the user can see what content is available in the repository, and structure his/her course design activities accordingly.

Some system embodiments may allow the user to automate the creation of variations on existing course structure hierarchies. These embodiments may allow the user to adapt existing hierarchies for their own use, or prepare an existing hierarchy for a different group of students. For instance, these embodiments may enable the user to generate a Spanish version of a hierarchy from an existing hierarchy written in English. These embodiments may also employ non-English language editing or character set functionality, which may be provided by third-party components, customized programmed instructions, or other means. Further, these system embodiments may be programmed such that functionality options (e.g., taxonomy choices) are presented to the user in a language other than English.

Some system embodiments may also be customized to diagnose the learning styles and sensory capabilities of students with learning disabilities, adapting the display of text, graphics, audio, video, animation, and/or simulation in a manner appropriate given the student's individual needs.

While the invention has been particularly shown and described with reference to specific embodiments and variations thereon, it will be understood by those skilled in the art that various additional changes in form and detail may be made therein without departing from the spirit and scope of the invention as defined above.

The invention claimed is:

1. A computer-implemented method for the dynamic generation of instructional content conforming to a course structure hierarchy comprising a plurality of taxonomies, comprising:

providing a graphical user interface executable on an operating system on a computer to enable a creation of a course structure hierarchy name and objective;

creating a course structure hierarchy name and objective by use of the graphical user interface;

defining the plurality of taxonomies to comprise the course structure hierarchy by use of the graphical user interface, each of the plurality of taxonomies being defined by a learning style exhibited by a student, at least two of the plurality of taxonomies being defined by different learning styles, each learning style being from a group comprising a first learning style whereby the student is engaged by an incremental approach to presenting content, a second learning style whereby the student is engaged by events presented in a story format, a third learning style whereby the student is engaged by being introduced to a principle and then to one or more topics that related to the principle, a fourth learning style whereby the student is engaged by being asked to infer concepts from data, simulations, graphs and/or charts, and a fifth learning style whereby the student is engaged by being introduced to a concept with a simulation, quiz and/or interactive exercise, wherein each of the plurality of taxonomies comprises a sequence including a particular type of trigger element and a prescribed sequence of qualifier elements adapted to the considered learning style, and wherein:

a taxonomy defined by the first learning style comprises (a) a step trigger element and (b) a sequence of description, example, exposition and procedure qualifier elements, a taxonomy defined by the second learning style comprises (a) an event trigger element and (b) a sequence of illustration, description, example, and procedure qualifier elements, a taxonomy defined by the third learning style comprises (a) an example trigger element and (b) a sequence of example, explanation and demonstration qualifier elements, a taxonomy defined by the fourth learning style comprises (a) a data trigger element and (b) a sequence of question prompting, example, explanation and illustration qualifier elements, and a taxonomy defined by the fifth learning style comprises (a) an experiment trigger element and (b) a sequence of explanation, description, question prompting and illustration qualifier elements; and extracting, in an automated fashion, from at least one server-based data repository, content adapted to the course structure hierarchy created using the graphical user interface to comprise the trigger element and the prescribed sequence of qualifier elements for each of the plurality of taxonomies.

2. The method of claim 1, wherein the course structure hierarchy includes text which is provided in English.

3. The computer-implemented method of claim 1, further comprising an act of presenting, in an automated fashion, at least a portion of the content adapted to the course structure hierarchy to a first student, wherein the act of presenting comprises attempting to diagnose a learning style exhibited by the first student.

4. A computer-implemented method of defining a body of instructive content for a plurality of students each exhibiting a learning style, the method comprising:

providing a software viewer application;

providing coded logic executable on an operating system on a computer;

processing data including student viewing patterns and quiz results using the coded logic to determine individual preferences and abilities for a student and thereby to diagnose a learning style for the student;

providing by use of the software viewer application, for each of a plurality of learning styles, content dependent on a learning style diagnosed for the student comprising a trigger element adapted to attract the interest of the student, the trigger element for each learning style being adapted to suit student cognitive abilities associated with the learning style; and providing by use of the software viewer application, for each of the plurality of learning styles, content sequence dependent on the learning style diagnosed for the student comprising at least one qualifier element intended for presentation to a student subsequent to presentation of the trigger element to the student, the at least one qualifier element for each learning style being adapted to suit student cognitive abilities associated with the learning style;

wherein each of the plurality of learning styles is from a group comprising a first learning style whereby the student is engaged by an incremental approach to presenting content, a second learning style whereby the student is engaged by events presented in a story format, a third learning style whereby the student is engaged by being introduced to a principle and then to one or more topics that related to the principle, a fourth learning style whereby the student is engaged by being asked to infer concepts from data, simulations, graphs and/or charts, and a fifth learning style whereby the student is engaged by being introduced to a concept with a simulation, quiz and/or interactive exercise; and wherein the content adapted to each of the pluralities of learning styles comprises a sequence including (a) a particular type of trigger element and (b) a prescribed sequence of qualifier elements adapted to the considered learning style, and wherein:

content adapted to the first learning style comprises (a) a step trigger element and (b) a sequence of description, example, exposition and procedure qualifier elements, content adapted to the second learning style comprises (a) an event trigger element and (b) a sequence of illustration, description, example, and procedure qualifier elements, content adapted to the third learning style comprises (a) an example trigger element and (b) a sequence of example, explanation and demonstration qualifier elements, content adapted to the fourth learning style comprises (a) a date trigger element and (b) a sequence of question prompting, example, explanation and illustration qualifier elements, and content adapted to the fifth learning style comprises (a) an experiment trigger element and (b) a sequence of explanation, description, question prompting and illustration qualifier elements.

5. The method of claim 4, wherein the instructive content includes text which is provided in English.

6. A computer-readable medium with instructions recorded thereon, which instructions, when executed, cause at least one processor in a computer to:

present to a user an interface by means of which the user can provide input to effect creation of a course structure hierarchy comprising a plurality of taxonomies, each of the plurality of taxonomies being adapted to a learning style exhibited by a student and comprising a sequence including a particular type of trigger element and a prescribed sequence of qualifier elements adapted to a corresponding learning style, at least two of the plurality of taxonomies being adapted to different learning styles, each learning style being from a group comprising a first learning style whereby the student is engaged by an incremental approach to presenting content, a second learning style whereby the student is engaged by events presented in a story format, a third learning style whereby the student is engaged by being introduced to a principle and then to one or more topics that related to the principle, a fourth learning style whereby the student is engaged by being asked to infer concepts from data, simulations, graphs and/or charts, and a fifth learning style whereby the student is engaged by being introduced to a concept with a simulation, quiz and/or interactive exercise, wherein:

a taxonomy adapted to the first learning style comprises (a) a step trigger element and (b) a sequence of description, example, exposition and procedure qualifier elements, a taxonomy adapted to the second learning style comprises (a) an event trigger element and (b) a sequence of illustration, description, example, and procedure qualifier elements, a taxonomy adapted to the third learning style comprises (a) an example trigger element and (b) a sequence of example, explanation and demonstration qualifier elements, a taxonomy adapted to the fourth learning style comprises (a) a date trigger element and (b) a sequence of question prompting, example, explanation and illustration qualifier elements, and a taxonomy adapted to the fifth learning style comprises (a) an experiment trigger element and (b) a sequence of explanation, description, question prompting and illustration qualifier elements; and present to a user graphical user interface on a computer to enable the user to associate content to comprise the trigger element and the at least one qualifier element for each of the plurality of taxonomies thereby to create the course structure hierarchy;

provide a graphical user interface on a computer for enabling the learning style for the student to be established;

provide a software viewer application;

display content dependent on the learning style determined for the student, the content comprising the trigger element from the course structure hierarchy adapted to attract the interest of the student, the trigger element for each learning style being adapted to suit student cognitive abilities associated with the learning style; and display content sequence dependent on the learning style determined for the student comprising at least one qualifier element intended for presentation to the student subsequent to presentation of the trigger element to the student, the at least one qualifier element for each learning style being adapted to suit student cognitive abilities associated with the learning style;

whereby the course structure hierarchy comprises a plurality of taxonomies each adapted to the learning style exhibited by the student.

7. The computer-readable medium of claim 6, wherein the course structure hierarchy includes text which is provided in English.

* * * * *